(12) United States Patent
Sakata

(10) Patent No.: US 7,937,174 B2
(45) Date of Patent: May 3, 2011

(54) PLAYBACK APPARATUS, PLAYBACK METHOD, AND RECORDING MEDIUM

(75) Inventor: Junichiro Sakata, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 12/834,605

(22) Filed: Jul. 12, 2010

(65) Prior Publication Data

US 2010/0280642 A1    Nov. 4, 2010

Related U.S. Application Data

(60) Continuation of application No. 12/724,678, filed on Mar. 16, 2010, which is a continuation of application No. 11/585,139, filed on Oct. 24, 2006, which is a division of application No. 09/853,567, filed on May 11, 2001, now Pat. No. 7,216,008.

(30) Foreign Application Priority Data

May 15, 2000 (JP) ................ 2000-147472
May 15, 2000 (JP) ................ 2000-147474
May 15, 2000 (JP) ................ 2000-147476

(51) Int. Cl.
*G06F 17/00* (2006.01)
*G11B 21/08* (2006.01)
(52) U.S. Cl. .............................. 700/94; 369/30.08
(58) Field of Classification Search ............ 700/94; 715/716, 717, 720, 721, 727; 369/30.08
See application file for complete search history.

(56) References Cited

U.S. PATENT DOCUMENTS

| | | | |
|---|---|---|---|
| 5,616,876 | A | 4/1997 | Cluts |
| 5,668,788 | A | 9/1997 | Allison |
| 5,969,283 | A | 10/1999 | Looney et al. |
| 5,974,503 | A | 10/1999 | Venkatesh et al. |
| 6,452,609 | B1 | 9/2002 | Katinsky et al. |
| 6,721,489 | B1 | 4/2004 | Beyamin et al. |
| 2003/0112262 | A1 | 6/2003 | Adatia et al. |

FOREIGN PATENT DOCUMENTS

EP        0164253        5/1985
(Continued)

OTHER PUBLICATIONS

Lycos Inc: "Sonique Website" Feb. 29, 2000, XP002320604 Internet URL: http://web.archive.org/web20000229211624/www.sonique.com/ retrieved on Mar. 7, 2005.

(Continued)

*Primary Examiner* — Vivian Chin
*Assistant Examiner* — Daniel R Sellers
(74) *Attorney, Agent, or Firm* — Oblon, Spivak, McClelland, Maier & Neustadt, L.L.P.

(57) ABSTRACT

Audio data are played back by a personal computer a relationship with a playback process recognized easily. Displays showing the contents of play lists are arranged and displayed so that the contents become continuous in sequence in a playback sequence from content that is currently being played back from a display of an operation element that causes an image of a playback process to appear or from a display showing the content which is currently being played back. When the playback of one piece of content of one play list from among a plurality of play lists is terminated and one piece of content of an other play list is played back, at least the content that is currently being played back and content to be subsequently played back are displayed so that the contents can be distinguished.

10 Claims, 18 Drawing Sheets

FOREIGN PATENT DOCUMENTS

| | | |
|---|---|---|
| EP | 0932157 | 7/1999 |
| EP | 1162621 | 12/2001 |
| GB | 2244844 | 12/1991 |
| JP | 61-156564 | 7/1986 |
| JP | 5-081739 | 4/1993 |
| JP | 9-017159 | 1/1997 |
| JP | 10-40668 | 2/1998 |
| WO | WO 9733284 | 9/1997 |
| WO | WO 99/64969 | 12/1999 |
| WO | WO 00/54187 | 9/2000 |

OTHER PUBLICATIONS

Nullsoft Inc: "Winamp Website" Dec. 12, 1998, XP002320605 Internet URL: http://web.archive.org/web/19981212022229/http://winamp.com/ retrieved on Mar. 7, 2005.

Screen shots of Winamp version 2.04; Oct. 23, 1998.

FIG. 11

| STYLE | | HARD | STANDARD | SOFT |
|---|---|---|---|---|
| SOUND VOLUME | | HIGH VOLUME | MEDIUM VOLUME | LOW VOLUME |
| EQUALIZER | | ROCK | POP | SOFT |
| SOUND FIELD | | SMALL ROOM | STADIUM | LARGE HALL |
| SWITCHING INFOR-MATION | PLAYBACK REFERENCE TIME PERIOD | 20 SECONDS | 40 SECONDS | 60 SECONDS |
| | CHANGE TIME PERIOD | 1 SECOND | 5 SECONDS | 10 SECONDS |
| | TRANSITION TIME PERIOD | 0 SECONDS | 2 SECONDS | 5 SECONDS |
| GUI INFORMATION | | HARD | STANDARD | SOFT |
| MOVING PICTURE | | HARD | STANDARD | SOFT |

FIG. 12

| STYLE | HARD | STANDARD | SOFT |
|---|---|---|---|
| SWITCHING-TIME | ○○○ | △△△ | ×××　 |
| SOUND EFFECT 1 | H1 | ST1 | SF1 |
| SOUND EFFECT 2 | H2 | ST2 | SF2 |
| ⋮ | ⋮ | ⋮ | ⋮ |
| SOUND EFFECT 10 | H10 | ST10 | SF10 |

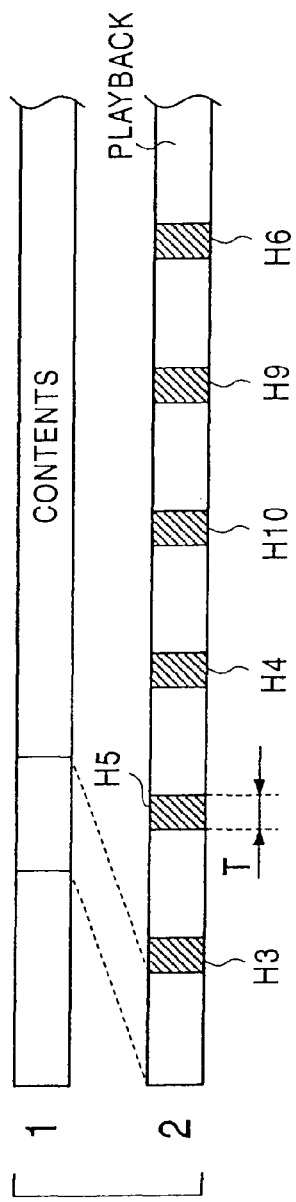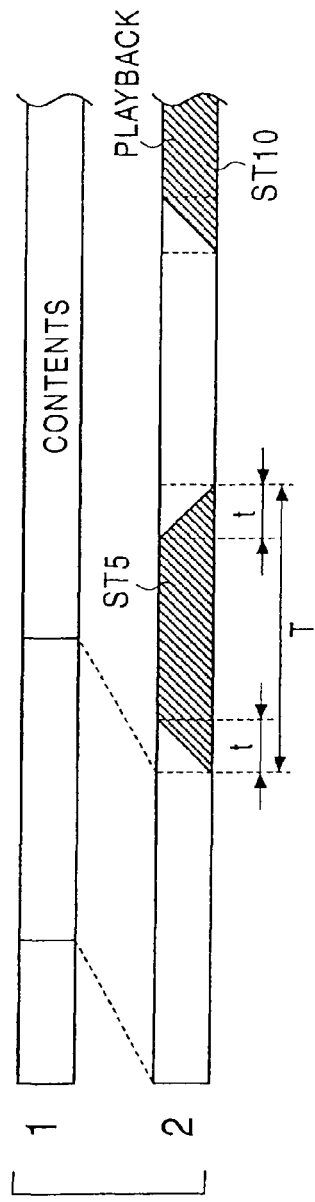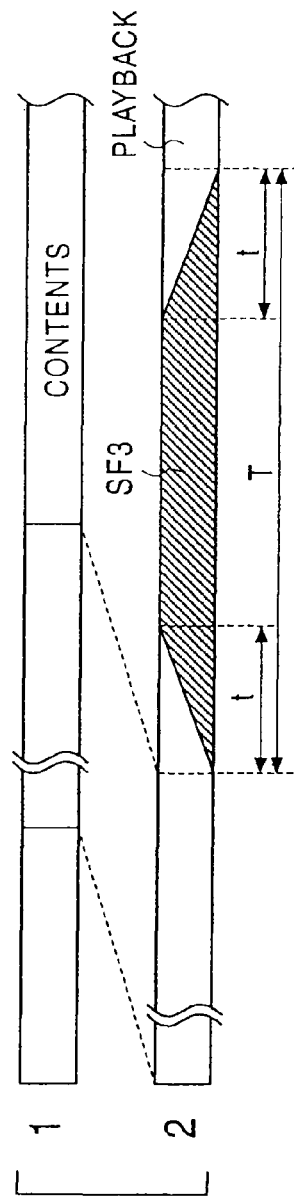

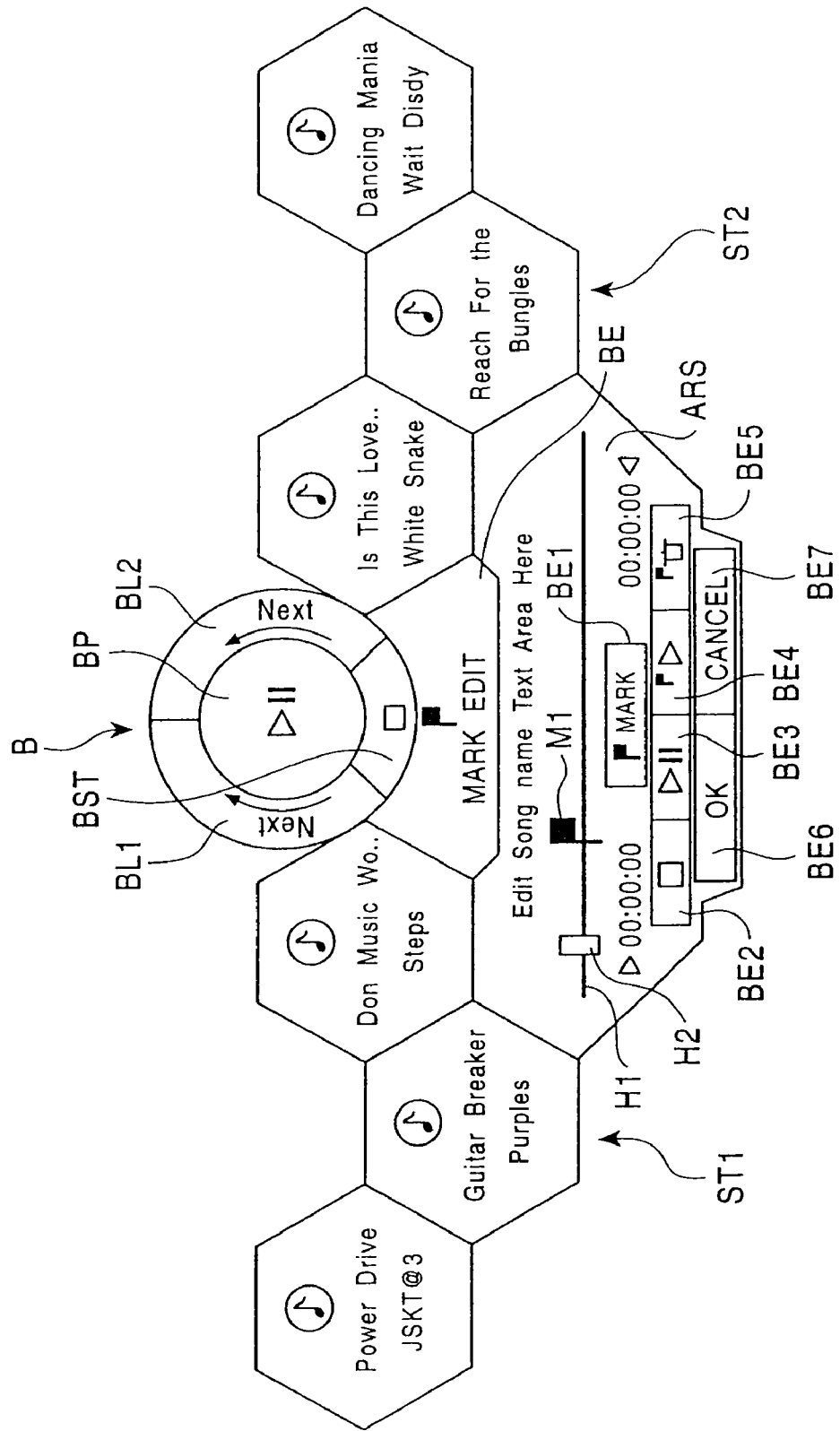

PLAYBACK APPARATUS, PLAYBACK METHOD, AND RECORDING MEDIUM

CROSS-REFERENCE TO RELATED APPLICATIONS

This application is a Continuation of and is based upon and claims the benefit of priority under 35 U.S.C. §120 for U.S. Ser. No. 12/724,678, filed Mar. 16, 2010 which is a Continuation of U.S. Ser. No. 11/585,139, filed Oct. 24, 2006. U.S. Ser. No. 11/585,139 is a Divisional of U.S. patent application Ser. No. 09/853,567, filed May 11, 2001, and the contents of each of which are incorporated herein by reference in their entirety. This application also claims the benefit of priority under 35 U.S.C. §119 from Japanese Patent Application Nos. 2000-147476, No. 2000-147474, and No. 2000-147472, all of which were filed May 15, 2000.

BACKGROUND OF THE INVENTION

1. Field of the Invention

The present invention relates to a playback apparatus, a playback method, and a recording medium, and can be applied to a case in which, for example, audio data is played back by a personal computer.

2. Description of the Related Art

Conventionally, in personal computers, for example, entry of a play list by a user is received, and audio data, which is content recorded on a hard disk unit, can be played back in accordance with the play list.

Furthermore, in such a playback of audio data, parameters used in the setting of an equalizer, a sound field, etc., can be switched by an operation of a user. As a result, audio data can be played back in an atmosphere desired by the user. On the display screen, operation elements for switching these effects is displayed so that the background can be changed variously in accordance with the preference of the user.

For such a playback in accordance with a play list, in addition to the playback of audio data based on the sequence recorded in the play list, there is what is commonly called a "random playback". This makes it possible to perform a playback in a different sequence of musical pieces each time a playback is performed so that the user do not become bored even when a playback is performed in accordance with the same play list.

However, even in such a random playback, there is a case in which the user becomes bored after all. Under these circumstances, if, in addition to such a playback method, these contents can be played back by another method, the ease of operation of this type of playback apparatus can be improved even more.

SUMMARY OF THE INVENTION

The present invention has been made in consideration of the above points. A first object of the present invention is to propose a playback apparatus, a playback method, which are capable of playing back contents by a method different from a conventional method, and a recording medium on which a playback procedure is recorded.

By cutting out each content and playing it back in sequence on the basis of a predetermined cut-out pattern in which at least a playback time is set, the contents can be played back by a method different from a conventional method.

If a setting operation such as that described above can be simplified, the ease of operation of this type of playback apparatus can be improved even more.

A second object of the present invention is to propose a playback apparatus, a playback method, which are capable of simplifying the setting of a display screen when audio data is played back by a personal computer, and a recording medium on which a playback processing procedure is recorded.

By switching the conditions of the operation of a processing system which processes contents and by stepping the design of a display screen in response to the switching, the setting of the display screen can be simplified.

In addition, for the playback of audio data in accordance with a play list such as that described above, a play list is displayed during playback, and this display of a play list makes it possible to confirm the sequence of the playback and the piece of music which is currently being played back. However, if the relationship with the playback process, such as what piece of music is currently being played back, and what piece of music is to be played back next, can be recognized even more easily, the ease of operation of this type of application program can be improved even more.

A third object of the present invention is to propose a playback apparatus, a playback method, which are capable of recognizing the relationship with the playback process even more easily than a conventional way, and a recording medium therefor.

The displays showing the contents of play lists are arranged and displayed from a display of an operation element which causes an image of a playback process to appear or from a display showing the content which is currently being played back so that the contents become continuous in sequence in a playback sequence, allowing the relationship with the playback process to be recognized more easily than a conventional way. Furthermore, when the playback of one piece of content of one play list from among a plurality of play lists is terminated, in a case where one piece of content of another play list is played back, at least the content which is currently being played back and the content which is to be played back next are displayed in such a manner that the contents can be mutually distinguished from the other content. Thus, even when a plurality of play lists is selected in content units, the relationship with the playback process can be recognized even more easily than a conventional way.

In order to achieve the above-mentioned objects, according to one aspect of the present invention, there is provided a playback apparatus or a playback method, in which portions to be partially played back are set in each content of a group of contents on the basis of a predetermined cut-out pattern in which at least a playback time is set, contents are selected in sequence from the group of contents, and the portions to be partially played back which are set in the selected content are played back in sequence.

According to another aspect of the present invention, there is provided a recording medium on which a processing procedure is recorded, the processing procedure comprising the steps of setting portions to be partially played back in each content of a group of contents based on a predetermined cut-out pattern in which at least a playback time is set, selecting a piece of content in sequence from the group of contents, and sequentially playing back these portions to be partially played back which are set in the selected content.

According to the construction of the playback apparatus or the playback method of the present invention, portions to be partially played back are set in each content of a group of contents based on a predetermined cut-out pattern in which at least a playback time is set, and these portions to be partially played back are played back in sequence, thereby making it possible to play back the contents like a digest in a television, a radio, etc.

As a result, according to the construction of the recording medium of the present invention, it is possible to obtain a recording medium on which a playback procedure capable of playing back contents by a method different from a conventional method is recorded.

According to another aspect of the present invention, there is provided a playback apparatus or a playback method, wherein the operating conditions of a processing system which processes at least contents are switched in response to an operation of a predetermined operation element, and the design of the display screen is switched in response to the switching.

According to another aspect of the present invention, there is provided a recording medium on which a playback procedure is recorded, the playback procedure comprising the steps of: switching the operating conditions of a processing system which processes at least contents in response to an operation of a predetermined operation element; and switching the design of a display screen in response to the switching.

According to the construction of the playback apparatus or the playback method of the present invention, the conditions of the operation of a processing system which processes at least contents is switched in response to an operation of a predetermined operation element, and the design of a display screen is switched in response to the switching, thereby making it possible to collectively switch the processing conditions and the design of the display screen. This makes it possible to simplify the setting of the display screen.

As a result, according to the construction of the recording medium of the present invention, it is possible to provide a recording medium on which a playback procedure capable of simplifying the setting of a display screen is recorded.

According to another aspect of the present invention, there is provided a playback apparatus or a playback method, wherein displays showing the contents of a play list are arranged so that the contents become continuous in sequence in a playback sequence from the content which is currently being played back at least from a display of an operation element for instructing the starting or stopping of playback, and the play list is displayed.

According to another aspect of the present invention, there is provided a playback apparatus or a playback method, wherein displays showing the contents of a play list are arranged so that the contents become continuous in sequence in a playback sequence with respect to a display showing the content which is currently being played back, and the play list is displayed.

According to another aspect of the present invention, there is provided a playback apparatus or a playback method, wherein a plurality of play lists are displayed, when the playback of one piece of content of one play list from among a plurality of play lists is terminated, one piece of content of another play list is played back, and at least the content which is currently being played back and the content to be played back next are displayed in such a way that the contents can be mutually distinguished from the other content.

According to another aspect of the present invention, there is provided a recording medium on which a playback processing procedure is recorded, the playback processing procedure comprising the steps of: arranging the displays showing the contents of a play list so that the contents become continuous in sequence in a playback sequence from the content which is currently being played back at least from a display of an operation element for instructing the starting or stopping of playback; and displaying the play list.

According to another aspect of the present invention, there is provided a recording medium on which a playback processing procedure is recorded, the playback processing procedure comprising the steps of: forming a display showing the content which is currently being played back in a predetermined area of a display section; arranging the displays showing the contents of the play list so that the contents become continuous in sequence in a playback sequence with respect to the display showing the content which is currently being played back; and displaying the play list.

According to another aspect of the present invention, there is provided a recording medium on which a playback processing procedure is recorded, the playback processing procedure comprising the steps of: displaying a plurality of play lists; when the playback of one piece of content of one play list from among the plurality of play lists is terminated, playing back one piece of content of another play list; and displaying at least the content which is currently being played back and the content to be played back next in such a way that the contents can be mutually distinguished from the other content.

According to the construction of the playback apparatus or the playback method of the present invention, the displays showing the contents of play list are arranged so that the contents become continuous in sequence in a playback sequence from the content which is currently being played back at least from a display of an operation element for starting or stopping of playback, and the play list is displayed. As a result, it is possible to cause an image of a playback process to appear by the display of the operation element, and to cause an image of a relationship between the playback process and the content to appear by the arrangement of the displays showing the continuous contents. Thus, it is possible to recognize the relationship with the playback process even more easily than a conventional way.

According to the construction of the playback apparatus or the playback method of the present invention, the displays showing the contents of the play list are arranged so that the contents become continuous in sequence in a playback sequence with respect to a display showing the content which is currently being played back, and the play list is displayed. As a result, it is possible to cause an image of a playback process to appear by the display showing the content which is currently being played back, and to cause an image of a relationship between the playback process and the content to appear by the arrangement of the displays showing the continuous contents. Thus, it is possible to recognize the relationship with the playback process even more easily than a conventional way.

According to the construction of the playback apparatus or the playback method of the present invention, a plurality of play lists is displayed, when the playback of one piece of content of one play list from among a plurality of play lists is terminated, one piece of content of another play list is played back, and at least the content which is currently being played back and the content to be played back next are displayed so that the contents can be mutually distinguished from the other content. Thus, even when a plurality of play lists is selected in content units and is played back, the relationship with the playback process can be recognized even more easily than a conventional way.

As a result, according to the construction of the recording medium on which a playback processing procedure is recorded of the present invention, the playback processing procedure arranges the displays showing the contents of the play list so that the contents become continuous in sequence in a playback sequence from the content which is currently being played back at least from a display of an operation element for instructing the starting or stopping of playback, and displays the play list. Thus, it is possible to provide a recording medium on which a playback processing procedure capable of recognizing a relationship with a playback process even more easily than a conventional way is recorded.

According to the construction of the recording medium on which a playback processing procedure is recorded of the present invention, the playback processing procedure forms a display showing the content which is currently being played back in a predetermined area of a display shown, the displays showing the contents of play lists are arranged so that the contents become continuous in sequence in a playback sequence with respect to a display showing the content which is currently being played back, and displays the play list. Thus, it is possible to provide a recording medium on which a playback processing procedure capable of recognizing a relationship with a playback process even more easily than a conventional way is recorded.

According to the construction of the recording medium on which a playback processing procedure is recorded of the present invention, the playback processing procedure displays a plurality of play lists, when the playback of one piece of content of one play list from among a plurality of play lists is terminated, plays back one piece of content of another play list, and displays at least the content which is currently being played back and the content to be played back next in such a way that the contents can be mutually distinguished from the other content. Thus, even when a plurality of play lists is selected in units of contents and is played back, it is possible to provide a recording medium on which a playback processing procedure capable of recognizing a relationship with a playback process even more easily than a conventional way is recorded.

The above and further objects, aspects and novel features of the invention will become more fully apparent from the following detailed description when read in conjunction with the accompanying drawings.

BRIEF DESCRIPTION OF THE DRAWINGS

FIG. 11 is a table showing a template;

FIG. 12 is a table showing sound effects which are set in the template;

FIGS. 17A, 17B, and 17C are diagrams showing the connection of contents according to the process of FIG. 16; and FIG. 18 is a plan view illustrating editing.

DESCRIPTION OF THE PREFERRED EMBODIMENTS

The preferred embodiments of the present invention will now be described below with reference to the accompanying drawings where appropriate.

(1) Construction of the Embodiments (1-1) Overall Construction

Figure 1:
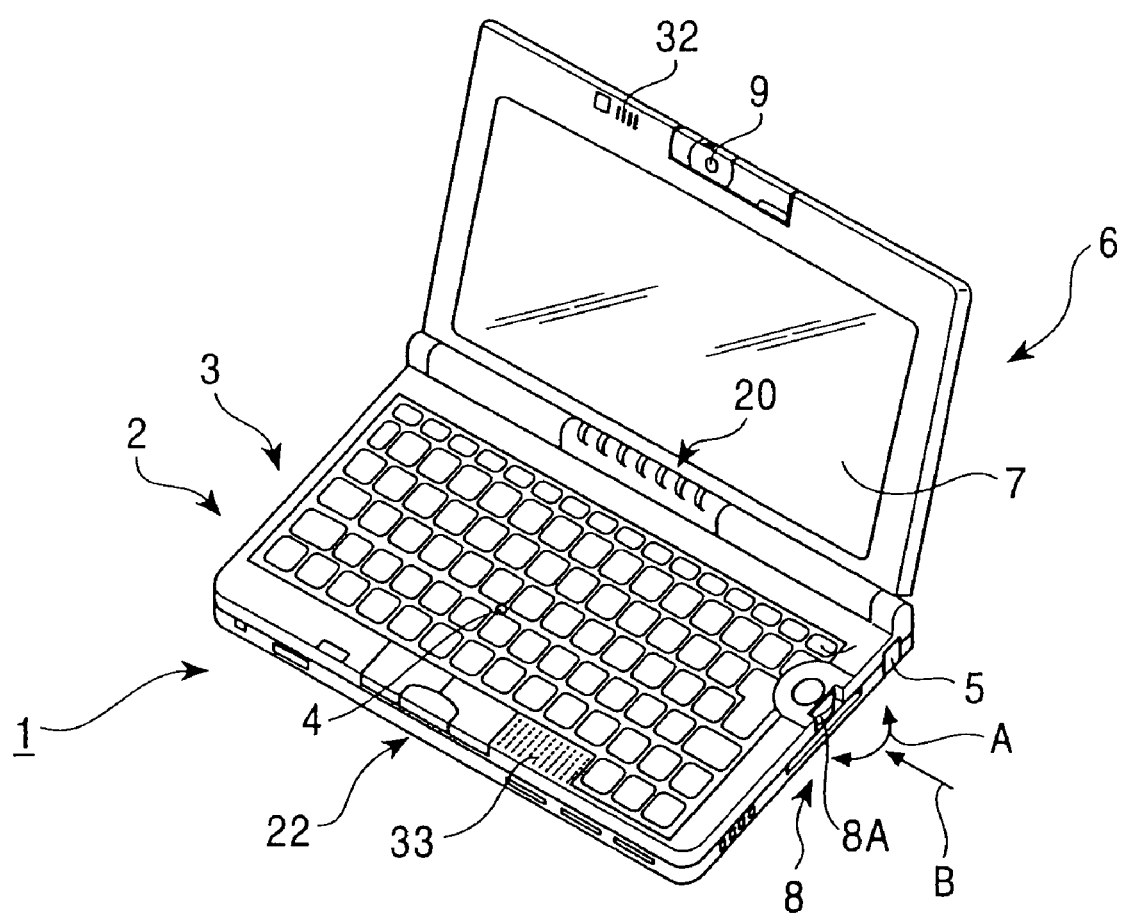
FIG. 1 is a perspective view showing a personal computer according to an embodiment of the present invention.

FIG. 1 is a perspective view showing a personal computer according to an embodiment of the present invention. Similar to a normal notebook-type personal computer, this personal computer 1 is constructed in such a way that, in terms of appearance, an operation key 3, a pointing device 4, a modem terminal 5, etc., are disposed on the main unit 2 side, and a liquid-crystal display panel 7 is disposed on the lid 6 side. Furthermore, for this personal computer 1, a jog dial 8 is disposed on the side of the main unit 2, and a CCD camera 9 is disposed on the upper portion of the liquid-crystal display panel 7. Here, the jog dial 8 is a rotational operation element which includes a switch functions based on a pressing operation, as indicated by the arrow B, so that an operation similar to an operation of a mouse, in a predetermined direction, can be performed by rotating the rotational operation element 8A which is shaped like a circular plate disposed in such a manner as to slightly project from the side of the main unit 2, as indicated by the arrow A.

Figure 2:
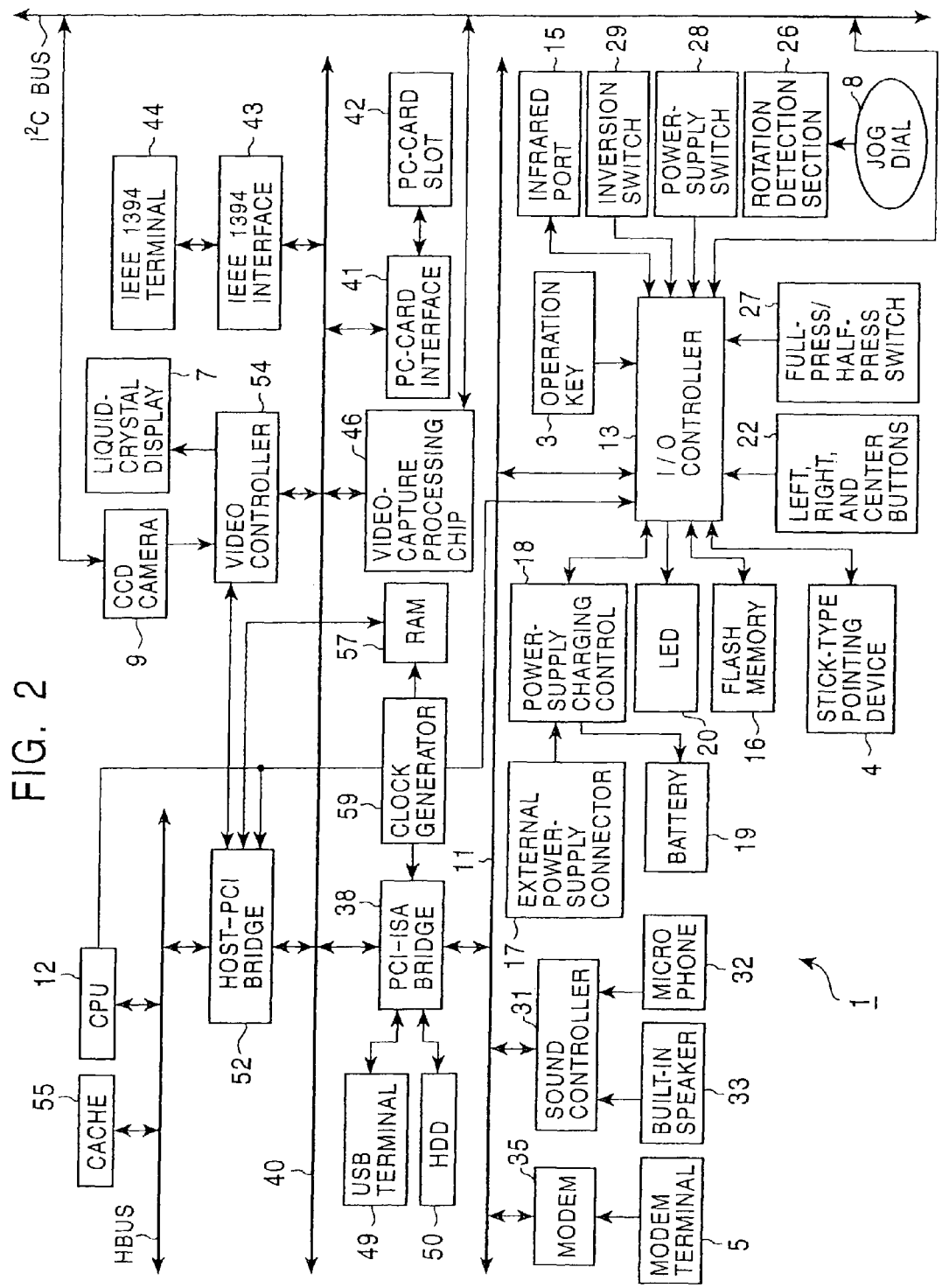
FIG. 2 is a block diagram showing the personal computer of FIG. 1.

FIG. 2 is a block diagram showing the construction of the personal computer 1. In the personal computer 1, various interfaces are connected to an ISA (Industry Standard Architecture) bus 11, and the operation of the operation key 3, irregularities of the power source, and so on are reported via this ISA bus 11 to a central processing unit 12.

More specifically, in the personal computer 1, an I/O controller 13 forms, to and from the ISA bus 11, an interface for the operation key 3 through the use of alphanumeric keys, etc., an interface for a communication unit through the use of infrared rays, which is connected to an infrared port 15, and an interface for a flash memory 16. The personal computer 1 operates by power which is input from an external power-supply connector 17 or by a battery 19 under the control of a power-supply charging control circuit 18. The battery 19 is charged by the power input from the external power-supply connector 17. The I/O controller 13 forms an interface for this power-supply charging control circuit 18. Furthermore, the I/O controller 13 forms a driving circuit for a light-emitting diode (LED) 20 disposed on the operation panel and further forms an interface for the stick-type pointing device 4 which is a coordinate input means and an interface for the left, right, and center buttons 22 corresponding to the operation elements such as a right click, a left click, etc., of a mouse. Furthermore, the I/O controller 13 forms an interface to and from a rotation detection section 26 for detecting an amount of the rotational operation of the jog dial 8, an interface for a full-press/half-press switch 27 for detecting a pressing operation of this jog dial 8, and an interface for a power-supply switch 28 and an inversion switch 29.

A sound controller 31 is an interface for the input/output of an audio signal, which is connected to the ISA bus 11. The sound controller 31 performs an analog-to-digital conversion process on an audio signal obtained via a microphone 32, and outputs it to the ISA bus 11. Contrary to this, the sound controller 31 performs a digital-to-analog conversion process on audio data output to the ISA bus 11 and drives a built-in speaker 33.

A modem 35 is connected to an ISDN line, etc., via the modem terminal 5. The modem 35, which is connected to the ISA bus 11, forms an interface to and from various information networks. As a result of the above, it is possible for the personal computer 1 to obtain desired information from a network such as, for example, the Internet, in response to an operation of the operation key 3, etc.

In the personal computer 1, this ISA bus 11 is connected to a PCI (Peripheral Component Interconnect) bus 40 via a PCI-ISA bridge 38, and an interface having a high transmission speed is connected to this PCI bus 40. That is, a PC-card interface 41 is connected to the PCI bus 40 and forms an interface for a PC card loaded into a PC-card slot 42. Furthermore, an IEEE 1394 interface 43 is similarly connected to the PCI bus 40 so as to form an interface for the IEEE 1394 to and from a device connected to an IEEE 1394 terminal.

A video-capture processing chip 46 is connected to the PCI bus 40 so as to form an interface for the CCD camera 9. The video-capture processing chip 46 is also connected to the CCD camera 9 by an I$^2$C bus. The PCI-ISA bridge 38 forms an interface between the PCI bus 40 and the ISA bus 11, an interface between the PCI bus 40 and a USB (Universal Serial Bus)-based terminal (USB terminal) 49, and an interface between the PCI bus 40 and a hard disk drive (HDD). As a result, in the personal computer 1, an application program recorded on the hard disk drive 50 is activated and, furthermore, various information is recorded on the hard disk drive 50. Furthermore, the various information obtained from a network in accordance with this application program can be downloaded to various devices via the USB terminal 49, and contrary to this, desired data can be uploaded from various devices.

In the personal computer 1, this PCI bus 11 is connected to a host bus HBUS via a host PCI bridge 52, and a cache memory (cache) 55 and the central processing unit 12 are connected to this host bus HBUS. Furthermore, a video controller 54 is connected to the host bus HBUS via the host PCI bridge 52. This allows an image obtained by the CCD camera 9 and various GUI information necessary for the operation of the personal computer 1 to be displayed on the liquid-crystal display panel 7 under the control of the video controller 54 based on the control of the central processing unit 12. Furthermore, a random access memory (RAM) 57 is connected to the host bus HBUS via the host-PCI bridge 52, so that a work area for the central processing unit 12 can be allocated in the random access memory 57. In the personal computer 1, reference signals of various operation references are generated by a clock generator 59, and these signals are supplied to each circuit block.

For the personal computer 1 constructed in this manner, various application programs are executed on a predetermined operating system by a series of processes in the central processing unit 12 in accordance with the contents recorded on the hard disk drive 50. In the personal computer 1, as a result of executing a predetermined application program from among the various application programs, a connection to the Internet is made via the modem terminal 5, and various audio data is downloaded to the hard disk drive 50. Furthermore, audio data recorded on a compact disk is downloaded to the hard disk drive 50 via a CD-ROM drive connected to the PC-card interface 41.

At this time, in the personal computer 1, audio data is compressed in accordance with a predetermined format, and this data is recorded on the hard disk drive 50. Furthermore, audio data together with information about the copyright for restricting a copy, an artist's name, an album name, etc., is recorded on the hard disk drive 50 in accordance with a file format in which one piece of music is a unit. Furthermore, as a result of such settings at a download time and as a result of selecting audio data which is downloaded by a predetermined application program, a play list is created, and the file of this play list is recorded on the hard disk drive 50. Here, the play list is a file recorded in such a manner that the music titles of a plurality of music names which are, for example, selected by a user among pieces of music which are contents recorded on the HDD 50, can be displayed in a list, and is recorded in such a manner that the file of audio data can be specified by the music name recorded in this file. As a result, in the personal computer 1, pieces of music recorded on the hard disk drive 50 for each genre desired by the user, such as rock, pop, etc., and for each artist, can be collectively test-listened.

(1-2) MusicShaker (Trademark of Sony Corporation)

(1-2-1) Structure of the Menu Screen

Figure 3:
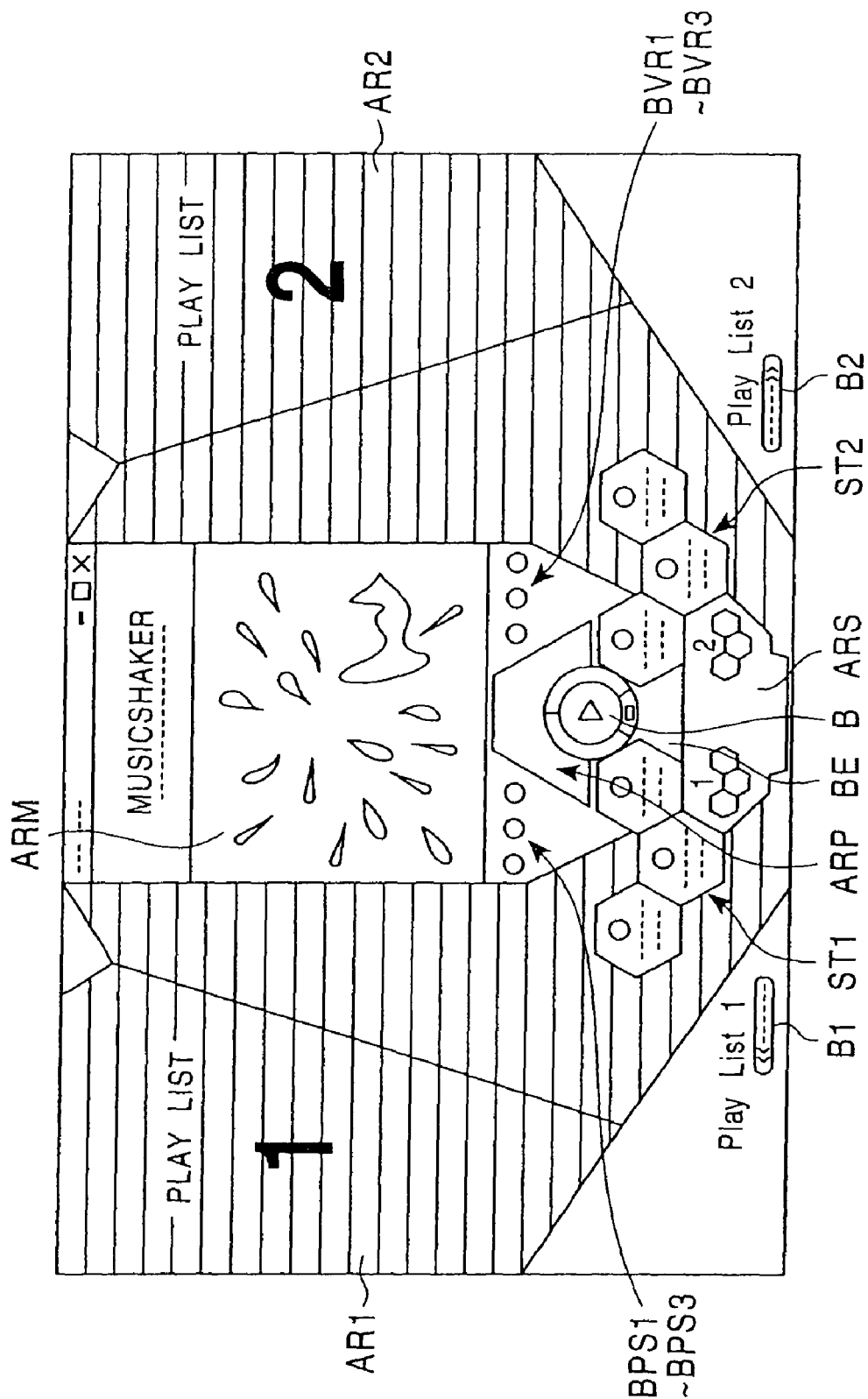
FIG. 3 is a plan view showing the menu screen of an application program in the personal computer of FIG. 1.

FIG. 3 is a plan view showing a menu screen of MusicShaker which is one of the application programs recorded on the hard disk drive 50. MusicShaker is an application program for playing back pieces of music recorded in the play list selected by the user continuously without any interruptions.

Figure 4:
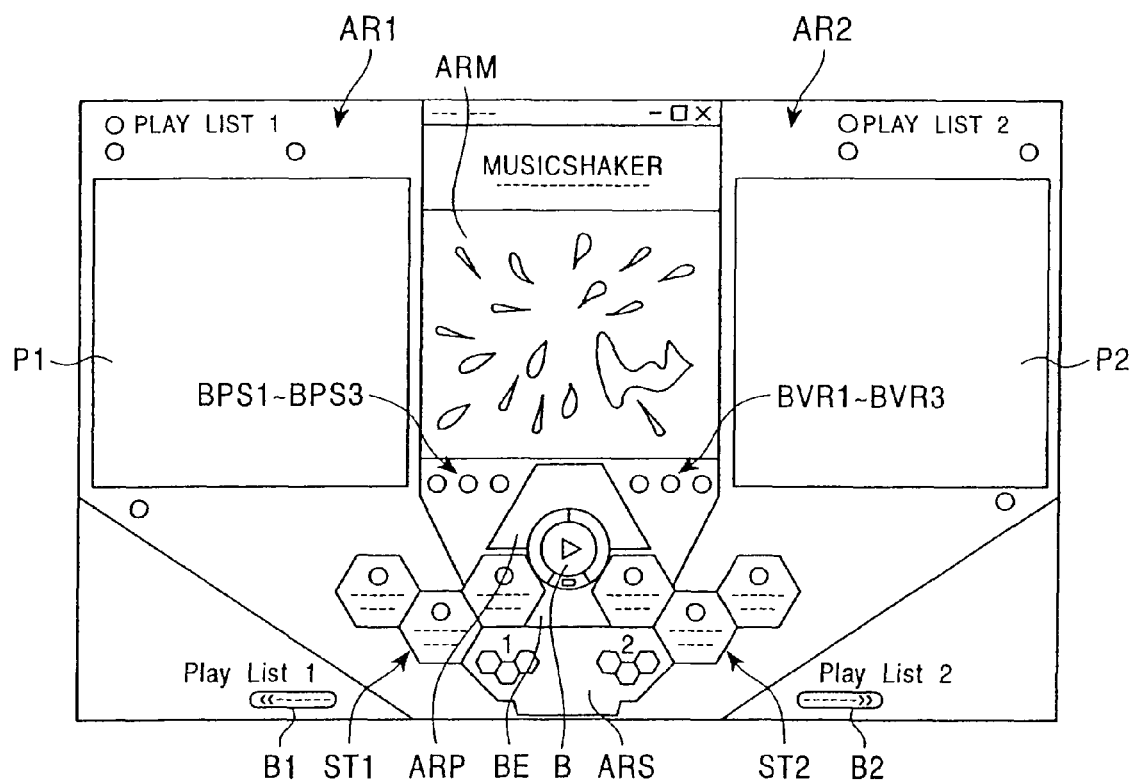
FIG. 4 is a plan view showing a state in which a display of a cover is removed the display screen of FIG. 3.

When the application program of this MusicShaker is selected by the user, the central processing unit 12 displays this menu screen. Here, on this menu screen, the play list display areas AR1 and AR2 are formed on both right and left sides, and an image which creates an image of a metallic-like cover to appear, is displayed in such a manner as to cover the display areas AR1 and AR2. On the menu screen, in these display areas AR1 and AR2, the words PLAY LIST 1 and PLAY LIST 2, each indicating a play-list display area, are displayed. Furthermore, below the display areas AR1 and AR2 of each play list, buttons B1 and B2 for opening or closing the display of the cover are disposed, respectively. When these buttons B1 and B2 are operated, the central processing unit 12, as shown in FIG. 4, switches the displays of these display areas AR1 and AR2, so that play lists P1 and P2 are displayed, respectively.

In contrast, in the upper central portion, a title bar is displayed by a design integrated with a menu bar. In this title bar, a button for closing the application program, a button for maximizing the display, a button for minimizing the display, a button for opening a help file, and a file button for opening a multiple-setting menu of this application program are displayed. Here, this setting is formed of a setting of the number of pieces of music to be auto-loaded into the play list, the setting for the jog dial 8, and so on.

In addition, in a portion below this title bar, the title of this application program is displayed, and then, a display area ARM of a moving picture for displaying a predetermined moving picture is formed. The central processing unit 12 creates an image of each frame which forms a moving picture by masking a predetermined still image with a plurality of mask images. Furthermore, the degree of the overlapping of the mask images, with respect to this still image, is varied on the basis of the frequency analysis results of the audio data, thereby a moving picture is displayed by a succession of frames which are created in this manner. As a result, the central processing unit 12 displays a moving picture which varies in accordance with the atmosphere of the piece of music which is being played back in the display area ARM of this moving picture. In this embodiment, as a result, a moving picture is displayed in such a manner that a cloud-like object is scattered radially from the center of this display area ARM.

Figure 5:
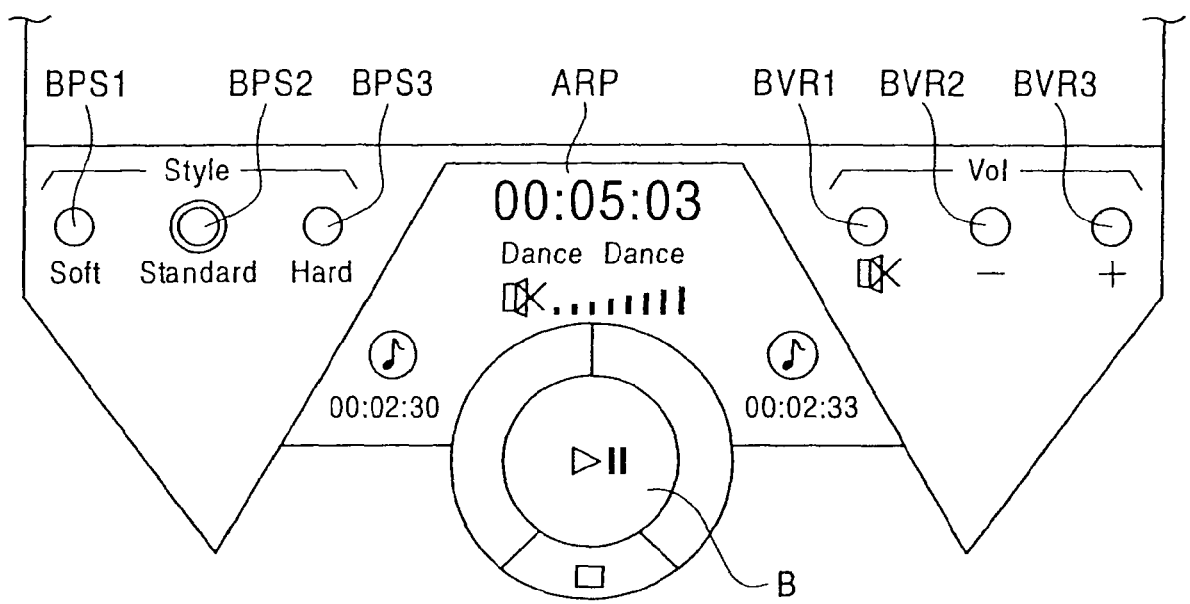
FIG. 5 is a plan view illustrating an area below a display area ARM of a moving picture on the display screen of FIG. 4.

In addition, on this menu screen, below the display area ARM for the moving picture, play-style change buttons BPS1 to BPS3, and sound-volume adjustment buttons BVR1 to BVR3 are separately disposed on the right and left, respectively, and in the center of these, a piece-of-music information display area ARP for a piece of music which is currently being played back is formed. Here, as these areas are magnified and shown in detail in FIG. 5, "soft", "standard", and "hard" are assigned to the play-style change buttons BPS1 to BPS3, respectively. The central processing unit 12 changes the style of the playback as a result of selecting these buttons BPS1 to BPS3. A circular bordering is displayed for the selected button. This style change will be described later.

Functions for "muting", "sound volume decrease", and "sound volume increase" are assigned to the volume adjustment buttons BVR1 to BVR3, respectively, and the central processing unit 12 adjusts the volume in response to the operation of these operation elements.

In contrast, in the piece-of-music information display area ARP, on the topmost part, the total playback time from the playback start is displayed, and then the title of the piece of music which is currently being played back is displayed. Next, information about the sound volume is displayed, the icon of the speaker and an x mark are overlappingly displayed to show the muting status, and an indicator of the sound volume is displayed on the right side of this mark. For these displays regarding the sound volume, when muting is performed, the display is produced only when the sound-volume adjustment button BVR2 or BVR3 is operated. In the lowermost part of the piece-of-music information display area ARP, playback times corresponding to the play lists P1 and P2 are displayed on the right and left, respectively.

On the menu screen (FIG. 3 or 4), below the piece-of-music information display area ARP, a playback operation button B in the shape of a circle is displayed, and stock trays ST1 and ST2 corresponding to the play lists P1 and P2 are displayed on both sides of this playback operation button B, respectively. The stock trays ST1 and ST2 are formed in such a way that three music-name display areas in the shape of a hexagon are each disposed around the button B. Below the playback operation button B, a button BE for an editing operation and a play-list status display area ARS are formed. For the play-list status display area ARS, symbols in which the displays of the stock trays ST1 and ST2 are reduced are displayed. The details of these buttons will be described later.

Figure 6:
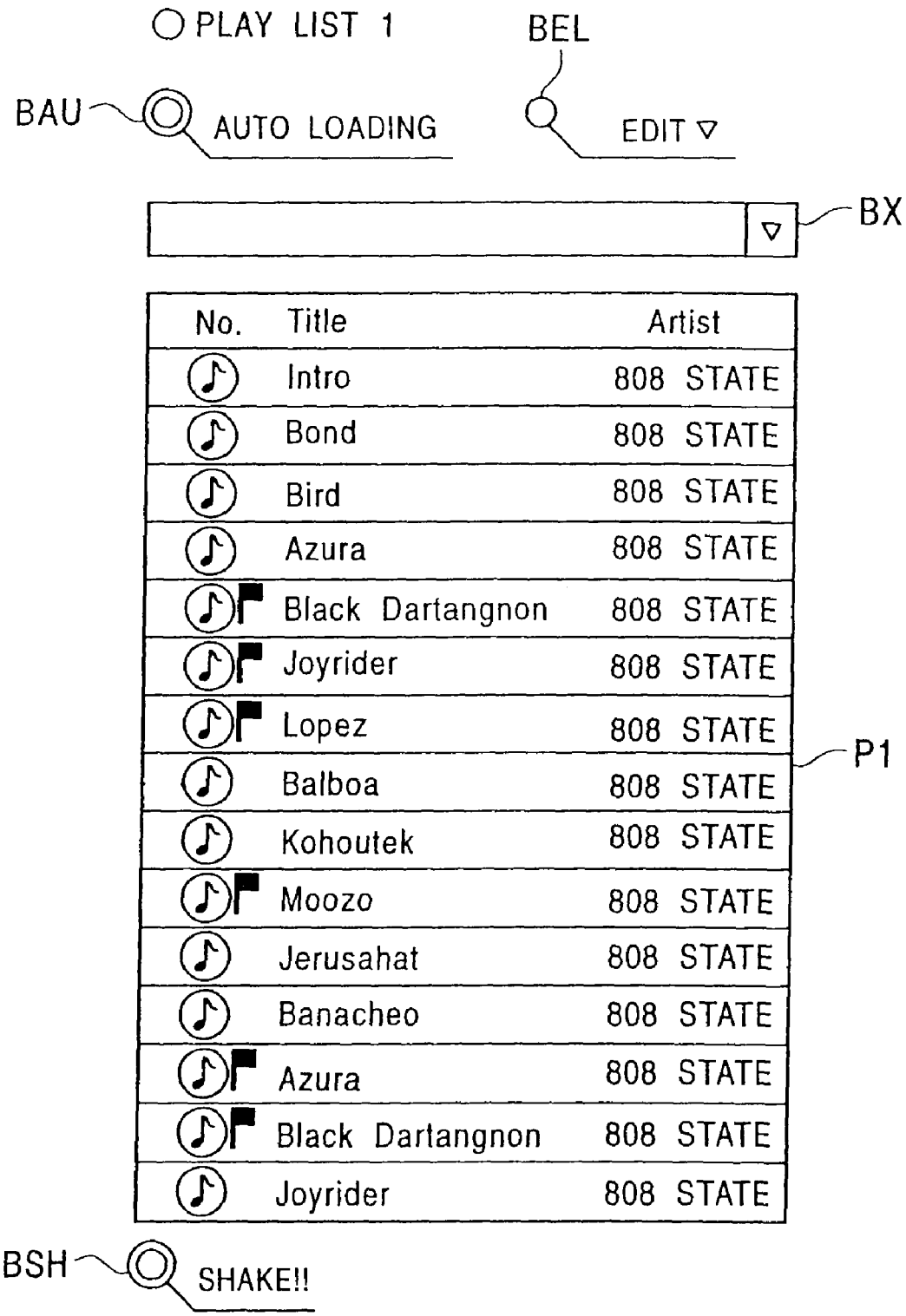
FIG. 6 is a plan view illustrating a play list on the display screen of FIG. 4.

FIG. 6 is a detailed plan view showing the play list P1 on the left side together with a display of a peripheral portion thereto. Since the display of the play list P2 on the right side and the peripheral portion thereto is the same, except that the display is formed to be symmetrical with respect to the display of the play list P1 on the left side and the peripheral portion thereto, a duplicate description is omitted.

Here, in the upper portion of the play list P1, an autoloading button BAU is disposed. When this button BAU is operated, the central processing unit 12 selects a music file recorded on the hard disk drive 50 in random in order to automatically create a play list, and displays this automatically created play list. Here, this random selection is performed in such a way that the contents are not duplicated in the play lists P1 and P2 and that the contents are not duplicated in one play list. As a result, even when a large number of pieces of music is recorded on the hard disk drive 50, the central processing unit 12 effectively avoids a complex operation by the user and creates a play list. A different list can be provided to the user every time.

Figure 7:
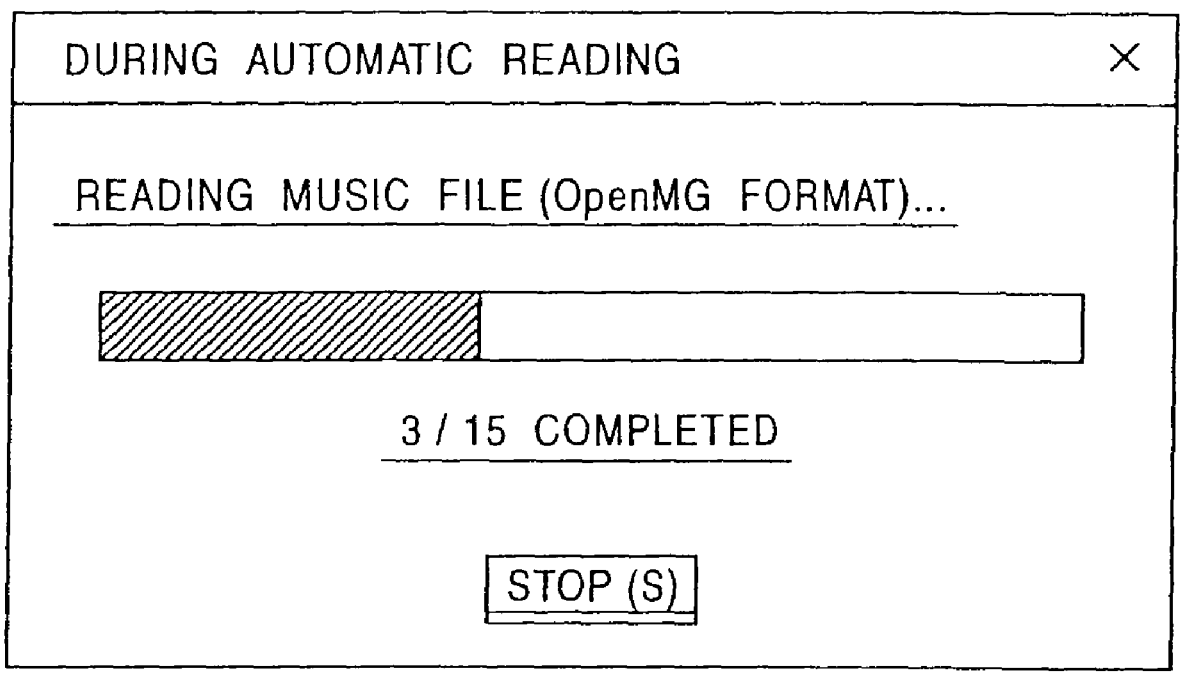
FIG. 7 is a plan view illustrating automatic play list creation.

When a large number of pieces of music is recorded on the hard disk drive 50, since it takes time to automatically create a play list in this manner, the central processing unit 12 displays a sub-window shown in FIG. 7, and feeds back the progress status of the automatic creation through the display of the bar graph within this sub-window.

Furthermore, in the center of this autoloading button BAU, a button BEL for opening an editing menu of the play list is displayed. When this button BEL is operated, the central processing unit 12 displays a predetermined pull-down menu. In addition, the central processing unit 12 performs a play-list creation process or a play-list changing process in response to the operation of the user in this pull-down menu.

Furthermore, below these buttons BAU and BEL, a combo box BX for selecting a play list is displayed. When this combo box BX is opened by the user, the personal computer displays the file names of the selectable play lists by a pull-down menu, and a selection in this menu causes the play list P1 to be set.

Figure 8:
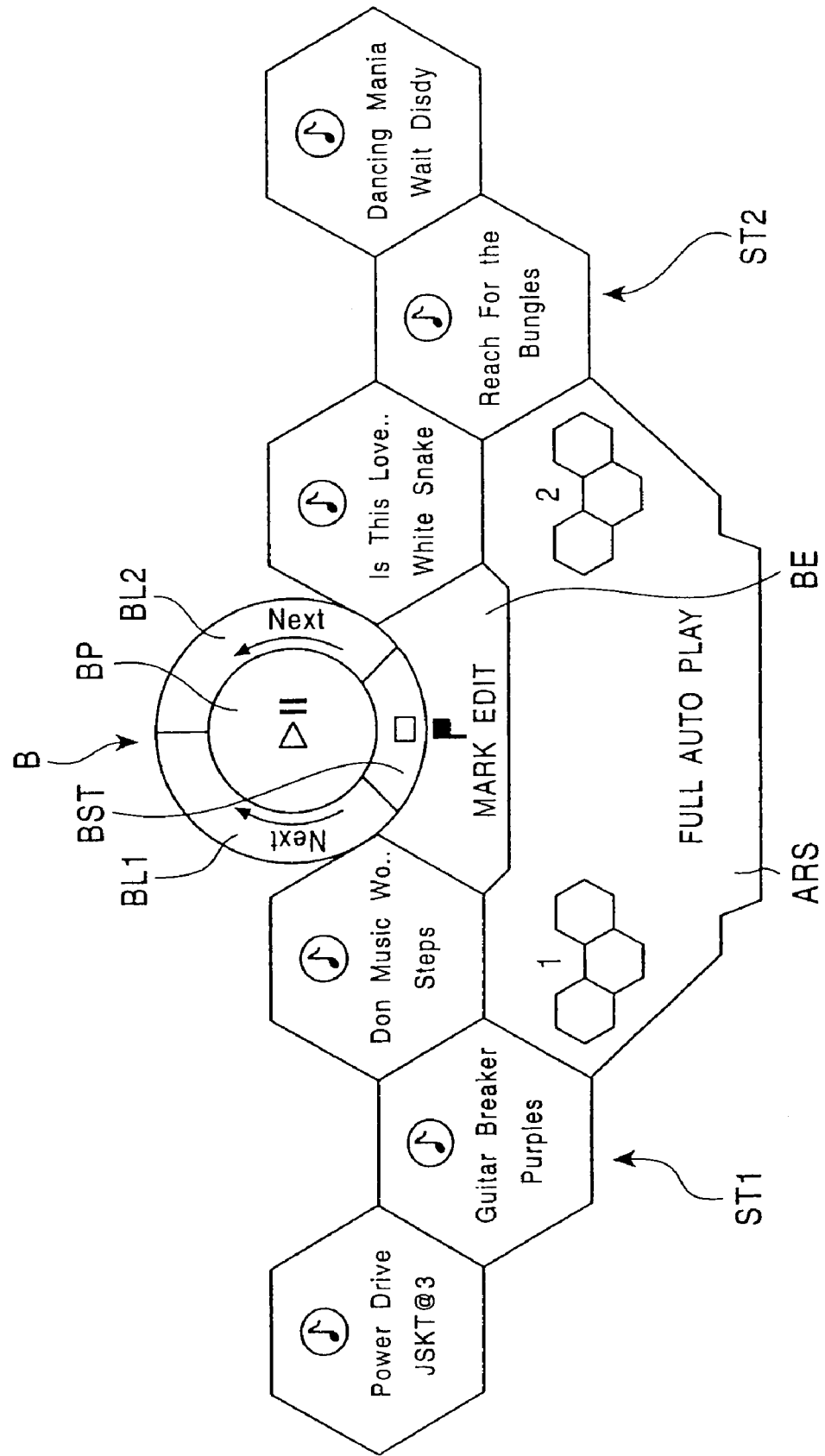
FIG. 8 is a plan view illustrating stock trays and the peripheral arrangement thereof on the display screen of FIG. 4.

For the play list selected in this manner, as shown in FIG. 8, music names are displayed in sequence from the piece-of-music display area of the stock tray ST1 in a portion closer to the button B, and the remaining pieces of music (titles) are displayed in sequence in a list from the lower portion together with the artist's name, thereby displaying the play list P1. In the display of the pieces of music in this play list P1 and the stock tray ST1, the central processing unit 12 displays an icon of a flag at the beginning of a piece of music in which an editing point (to be described later) is set.

When one of the pieces of music is selected and is dragged-and-dropped using a mouse by the user in this play list P1, in response to this operation, the central processing unit 12 interchanges the sequence of the displays. Furthermore, in a state in which an application program for managing files is activated at the same time, when the music name displayed by this application program is selected by the user and is dragged-and-dropped to this play list P1, in response to this dragging-and-dropping operation, this piece of music is added to the play list P1 which is currently being displayed and the play list P1 is displayed. Furthermore, with the play list P2 on the right side, the display of the play list is switched by similar dragging-and-dropping. As a result, the central processing unit 12 makes it possible for the user to freely change the play list. The process of interchanging these pieces of music can also be performed with a piece of music displayed on the stock trays ST1 and ST2.

Furthermore, when a desired piece of music is double-clicked by the user in this play list P1, the central processing unit 12 starts playing back this piece of music, thereby allowing the user to selectively test-listen a desired piece of music and to perform an operation for setting an editing point (to be described later).

On an initial screen, below this play list P1, a shake button BSH is displayed. When this shake button BSH is operated, the central processing unit 12 randomly interchanges the music names displayed in the play list P1 and the stock tray ST1. As a result, even when a playback is to be performed according to the same play list, the central processing unit 12 can perform a playback in a different sequence each time.

In that manner, in the stock trays ST1 and ST2 (FIG. 8), three music-name display areas are formed by a hexagonal border on both right and left sides corresponding to the play lists P1 and P2, respectively. In each music-name display area, information about each piece of music, excluding the artist from the display of each piece of music in the play list P1, is displayed. These music-name display areas are disposed in such a manner that the music-name display areas which are continuous on one side of the hexagonally shaped bordering are adjacent to each other and are disposed so as to be spread out from the piece-of-music information display area ARP indicating the piece of music which is currently being played back and the operation button B which is a display of an operation element for instructing the starting/stopping of playback toward the play lists P1 and P2 on the right and left. As a result, the music names can be continuously displayed in sequence in a playback sequence from the piece-of-music information display area ARP which is a display that causes an image of a playback process to appear and the operation button B together with the play lists P1 and P2.

As for the playback operation button B (FIG. 8), a playback/pause button BP in the shape of a circle is disposed in the center, and in a portion around the button BP, a stop button BST, a button BL1 for next for the play list P1, and a button BL2 for next for the play list P2 are disposed. Here, the playback/pause button BP is a display for an operation element for instructing the starting/stopping of playback. When this button BP is clicked using a mouse, the central processing unit 12 starts playing back audio data in accordance with the play lists P1 and P2 or causes this playback to pause. In comparison, the stop button BST is disposed below and in the center of the playback/pause button BP, whereas the buttons BL1 and BL2 for next are disposed symmetrically on the corresponding play lists P1 and P2 sides, respectively. When the stop button BST is operated during playback, the central processing unit 12 stops playback. Furthermore, when the buttons BL1 and BL2 for next are operated, the piece of music to be played back next is skipped on the play lists P1 and P2 sides, respectively, and the displays of the play lists P1 and P2 and the stock trays ST1 and ST2 are switched in such a manner as to correspond to the skip. In this case, when the button BL1 or BL2 for next is operated, this piece of music which is currently being played back is skipped, and the displays of the play lists P1 and P2 and the stock trays ST1 and ST2 are switched in such a manner as to correspond to the skip.

As indicated by the arrow B in FIG. 1, when the jog dial 8 is pressed, the central processing unit 12 switches the operation in the same way as when the playback/pause button BP is operated. In comparison, as indicated by the arrow A in FIG. 1, when the jog dial 8 is rotated, the central processing unit 12 switches the operation in the same way as when the button BL1 or BL2 for next is operated. This makes it possible for the central processing unit 12 to variously switch the operations also by the operation using the jog dial 8 instead of the button BP.

(1-2-2) Playback Process

Figure 9:
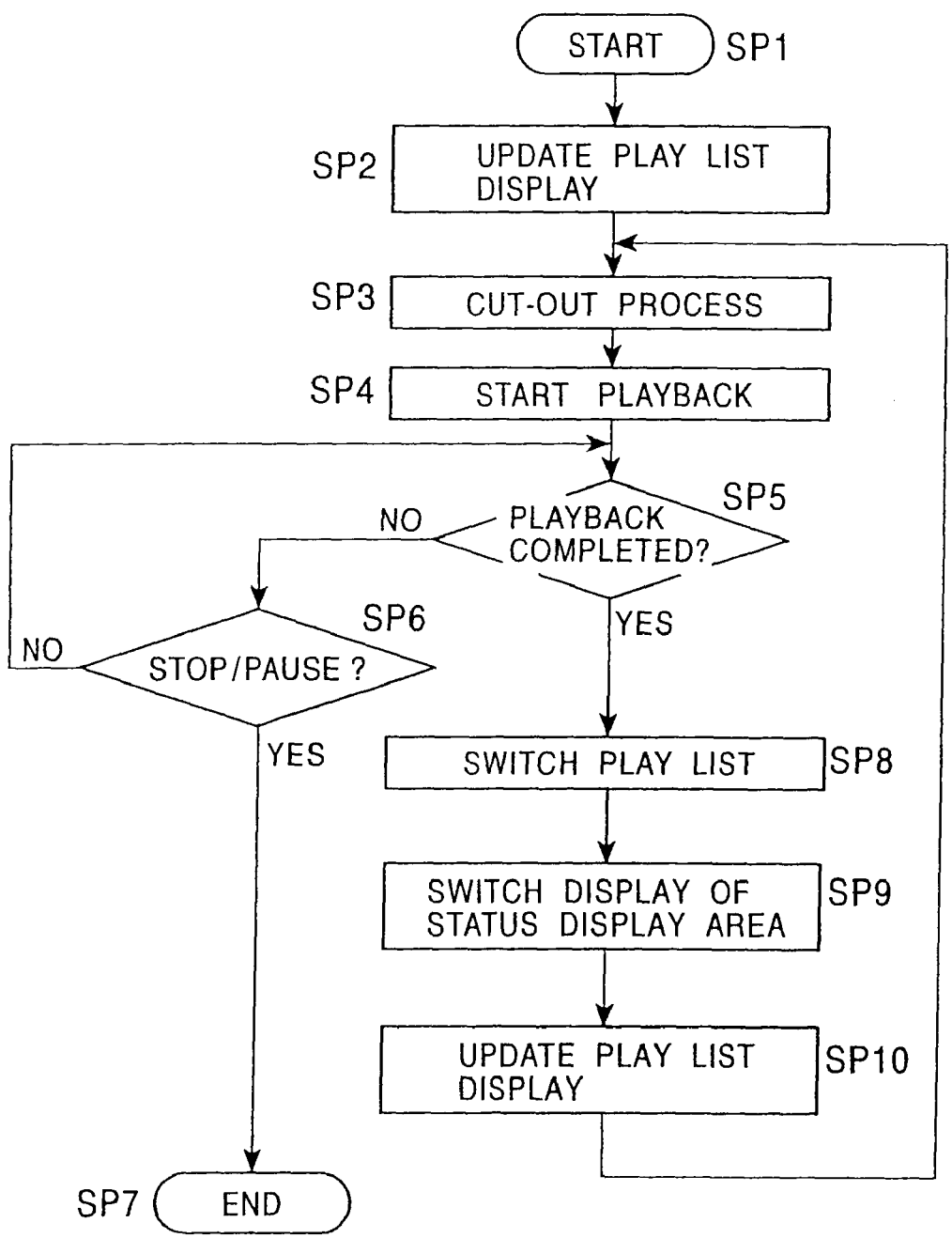
FIG. 9 is a flowchart illustrating the switching of play lists in the personal computer of FIG. 2.

FIG. 9 is a flowchart showing a processing procedure regarding such an initial screen of the central processing unit 12 when a playback start is instructed by operating the playback/pause button BP. The central processing unit 12 plays back pieces of music according to two play lists in alternate sequence as a result of executing this processing procedure, and switches the displays of the play lists P1 and P2 and the stock trays ST1 and ST2 in such a manner as to correspond to this playback.

Here, as for the play-list status display area ARS, the central processing unit 12 receives a playback instruction by operating the playback/pause button BP in a state in which a display, corresponding to the stock tray ST1 on the play list P1 side, is activated in a default state, and in a state after a stopping or pausing state, the central processing unit 12 receives a playback instruction in a state in which a display, corresponding to the stock tray ST1 or ST2 on the side in which a playback was being performed, is activated.

When the playback instruction is received, the central processing unit 12 proceeds from step SP1 to step SP2, whereby the display of the play list P1 and the stock tray ST1 and the display of the play list P2 and the stock tray ST2, on a side where playback is performed, are switched as necessary. Here, this display switching is performed in a case where the piece of music which is currently being played back is not displayed in the piece-of-music information display area ARP. Therefore, when playback is started from a pause state, the central processing unit 12 proceeds to the following step SP3 without performing the processing procedure of step SP2. In comparison, when playback is started from a default state, etc., the display of the play list P1 and the stock tray ST1 is moved in sequence to the piece-of-music information display area ARP side, thereby switching this display.

In the following step SP3, the central processing unit 12 sets an editing point based on the conditions set by the user with regard to the piece of music displayed in the piece-of-music information display area ARP, thereby cutting out a portion of this piece of music and setting a playback object. In the following step SP4, the playback of this playback object is started. In the following step SP5, the central processing unit 12 determines whether or not the playback of this cut-out playback object has been completed. When a "NO" result is obtained in this step, the central processing unit 12 proceeds to step SP6, whereby it is determined whether or not the playback/pause button BP or the stop button BST has been operated. When a "YES" result is obtained in this step, the process proceeds to step SP7, whereby this processing procedure is terminated. When, in contrast, a "NO" result is obtained, the process returns to step SP5. As a result, the central processing unit 12 plays back the playback object which is cut-out in step SP3. When this playback is completed, a "YES" result is obtained in step SP5, and the process proceeds to step SP8.

At this point, the central processing unit 12 switches the play lists for playback objects, and in the following step SP9, the activation of the display, corresponding to the stock tray in the play-list status display area ARS, is switched so as to correspond to this play-list switching.

Furthermore, in the following step SP10, the display of the piece of music which is currently displayed in the piece-of-music information display area ARP is switched to the display of the piece of music displayed at the start of the stock tray of the play list on the selected side, and the display of the play list and the stock tray on the selected side is moved in sequence to the piece-of-music information display area ARP side in such a manner as to correspond to this display switching. As for the music name displayed thus far in the piece-of-music information display area ARP, the display position thereof is switched to the end of the original play list.

When the display is switched in this manner, the central processing unit 12 returns to step SP3, whereby a process for cutting out the piece of music displayed in the piece-of-music information display area ARP is performed once more. As a result, as the flow of the display of the music names is indicated by the arrow in FIG. 10, the central processing unit 12 alternately selects a piece of music and plays it back with regard to the two play lists, and switches the display of music names in a cyclical sequence in the play list, the stock tray, and the piece-of-music information display area ARP in such a manner as to correspond to this playback, so that audio data is played back in sequence in a commonly called "endless" manner in accordance with the two play lists.

When switching the display of music names in this manner, as for a piece of music which is not yet played back, the central processing unit 12 displays it by using a color and luminance which give a strong impression to the user, whereas, as for a piece of music whose playback is terminated and which is displayed at the end of the play lists P1 and P2, the central processing unit 12 displays it by using a color and luminance which give to the user an impression which is relatively weaker than that of the display of the piece of music before being played back. Specifically, as for the piece of music which is not yet played back, the music name thereof, etc., is displayed using a bright orange color, whereas for a piece of music whose playback has been terminated, the music name thereof, etc., is displayed using a gray color.

Furthermore, when the central processing unit 12 displays a piece of music before being played back and a piece of music whose playback has been terminated in this manner and performs playback in sequence, a state is reached in which all the music names displayed in the play lists P1 and P2 and the stock trays ST1 and ST2 are the pieces of music whose playback have been terminated. Then, for the side in which only the pieces of music whose playback have been terminated are present in this manner, the central processing unit 12 resets all the pieces of music to pieces of music which are not yet played back, and switches the display of these music names, etc.

(1-2-3) The Style During Playback of a Piece of Music

The central processing unit 12 switches the atmosphere during playback of the contents to be cut out and played back in this manner in response to an operation using the play list change buttons BPS1 to BPS3, and changes the design of the menu screen in response to this switching.

More specifically, the play list change buttons BPS1 to BPS3 are operation elements for selecting the style of playback according to a hard, standard, and soft atmosphere, respectively. In this application program, as shown in FIGS. 11 and 12, a template for setting the atmosphere of the playback is provided in such a manner as to correspond to each of these operation elements BPS1 to BPS3.

Here, for volume parameters which are set in these templates, parameters which set a gain when audio data is processed are provided so that the volume becomes progressively weaker in such a manner as to correspond to the style of playback according to a hard, standard, and soft atmosphere. Furthermore, for equalizer parameters, parameters are provided which correct the frequency characteristics of the audio data and which obtain frequency characteristics that accentuate a high and low tone in a playback style based on a hard atmosphere. Furthermore, for a playback style based on a standard atmosphere, parameters are provided so that substantially flat frequency characteristics are obtained, and for a playback style based on a soft atmosphere, parameters are provided so that frequency characteristics are obtained in which a high and low tone are suppressed.

In contrast, as for sound field parameters, parameters for reverberation to be added to the audio data are provided in such a way that, for a playback style based on a hard atmosphere, an atmosphere is created as if a recording is being test-listened in a small room; for a playback style based on a standard atmosphere, a recording is being test-listened in a stadium; and for a playback style based on a soft atmosphere, an atmosphere is created as if a recording is being test-listened in a large hall.

In this embodiment, the playback is performed in such a way that a sound effect (to be described later) is interposed between playback objects which are cut out in the above-described step SP3, and for the switching information, information about this cut-out process and information about the connection of a sound effect are specified. Of them, the playback reference time is a time of a playback reference of a playback object which is cut out from each content, and the following change time is a time for giving a change to this playback reference time. For a playback style based on a hard atmosphere, the playback reference time and the change time are set to 20 seconds and 1 second, respectively, and the central processing unit 12 sets a playback object in each content by irregularly varying the cut-out time each time a cut-out process is performed in the range of 19 (20-1) seconds to 21 (20+1) seconds. In contrast, for a playback style based on a standard atmosphere, the playback reference time and the change time are set to 40 seconds and 5 seconds, respectively, and the central processing unit 12 sets a playback object in each content by irregularly varying the cut-out time each time a cut-out process is performed in the range of 35 (40-5) seconds to 45 (40+5) seconds. Furthermore, for a playback style based on a soft atmosphere, the playback reference time and the change time are set to 60 seconds and 10 seconds, respectively, and thus, the central processing unit 12 sets a playback object in each content by irregularly varying the cut-out time each time a cut-out process is performed in the range of 50 (60-10) seconds to 70 (60+10) seconds.

In comparison, a transition time is a transition time when sound effects which are interposed between contents and the contents are connected by a cross-fade. For a playback style based on a hard atmosphere, the transition time is set to 0 seconds, whereas for a playback style based on a standard and soft atmosphere, the transition time is set to 2 seconds and 5 seconds, respectively. As a result, for a playback style based on a hard atmosphere, the playback object and the playback of the content are switched instantly by a cut, whereas for a playback style based on standard a and soft atmosphere, the contents and the sound effect are gradually switched, and at this time, the switching is performed at a more gradual speed for a soft case.

The GUI information is the design information of the above-described menu screen, and coordinate values at which buttons, etc., are disposed, the background, bit-map data of the buttons, etc., are entered so that a menu screen corresponding to a playback style based on a hard atmosphere, a playback style based on a standard atmosphere, and a playback style based on a soft atmosphere can be displayed. Furthermore, still pictures used for creating a moving picture, switching information for mask images, settings when these are made to perform a relative motion based on the frequency analysis results are assigned to the moving picture parameters.

Figure 13:
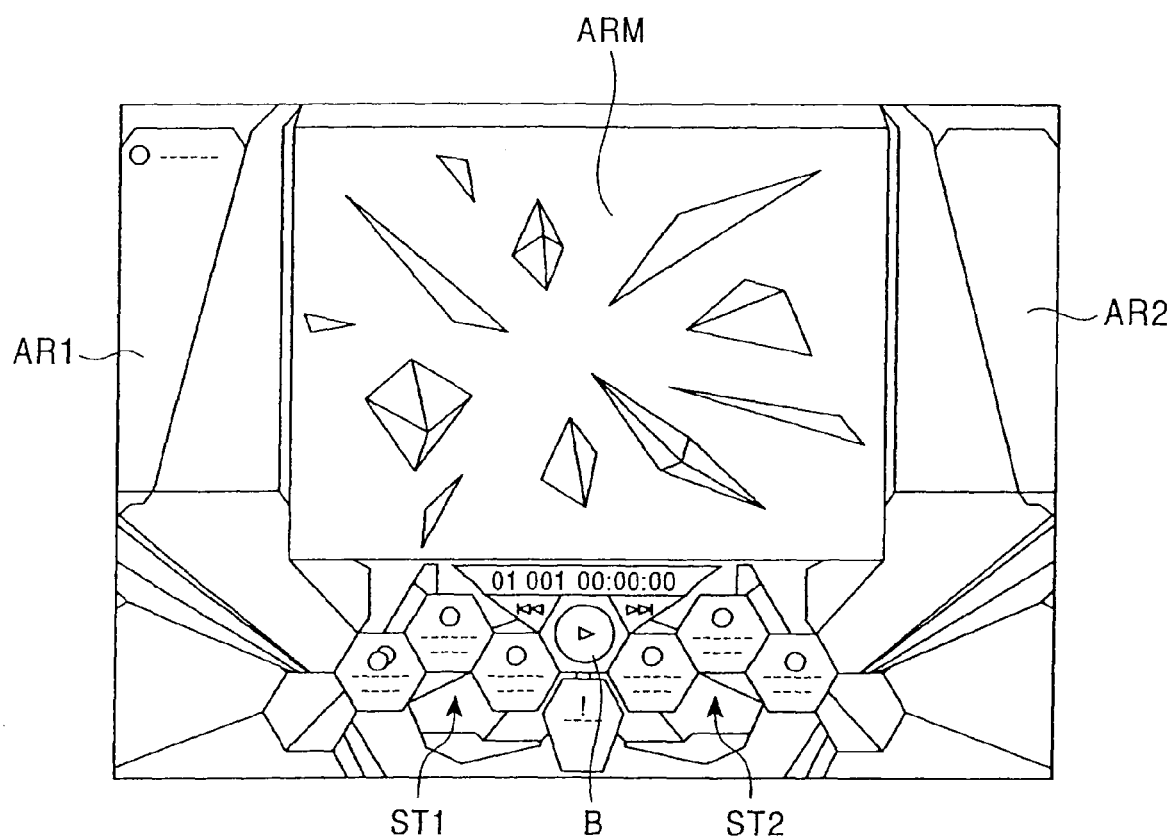
FIG. 13 is a plan view showing a display screen when a hard playback style is selected.

In that manner, the above-described menu screen of FIG. 1 is created by the GUI information and the moving picture parameters when a playback style based on a standard atmosphere is selected, and in comparison, FIG. 13 shows a menu screen when a playback style based on a hard atmosphere is selected. For this menu screen, based on the hard atmosphere, the moving picture is displayed by a larger screen, and the stock trays ST1 and ST2 are disposed upside down with respect to a standard case. Furthermore, large buttons are displayed, thereby allowing a desired operation to be reliably performed even if they are operated carelessly. The background is formed in such a way that it is divided into large areas by an oblique boundary line, and vibrant colors are placed in each divided area. The moving picture is formed in such a way that a cloud-like object having a sharp shape of vibrant color is spread out radially from the center. As a result, in this case, a strong impression is given to the user. Also, for this playback style based on a hard atmosphere, displays showing the contents of the play lists are arranged toward the display of operation elements and the display of the piece of music which is currently being played back. This makes it possible to recognize the relationship with the playback process even more easily.

Figure 14:
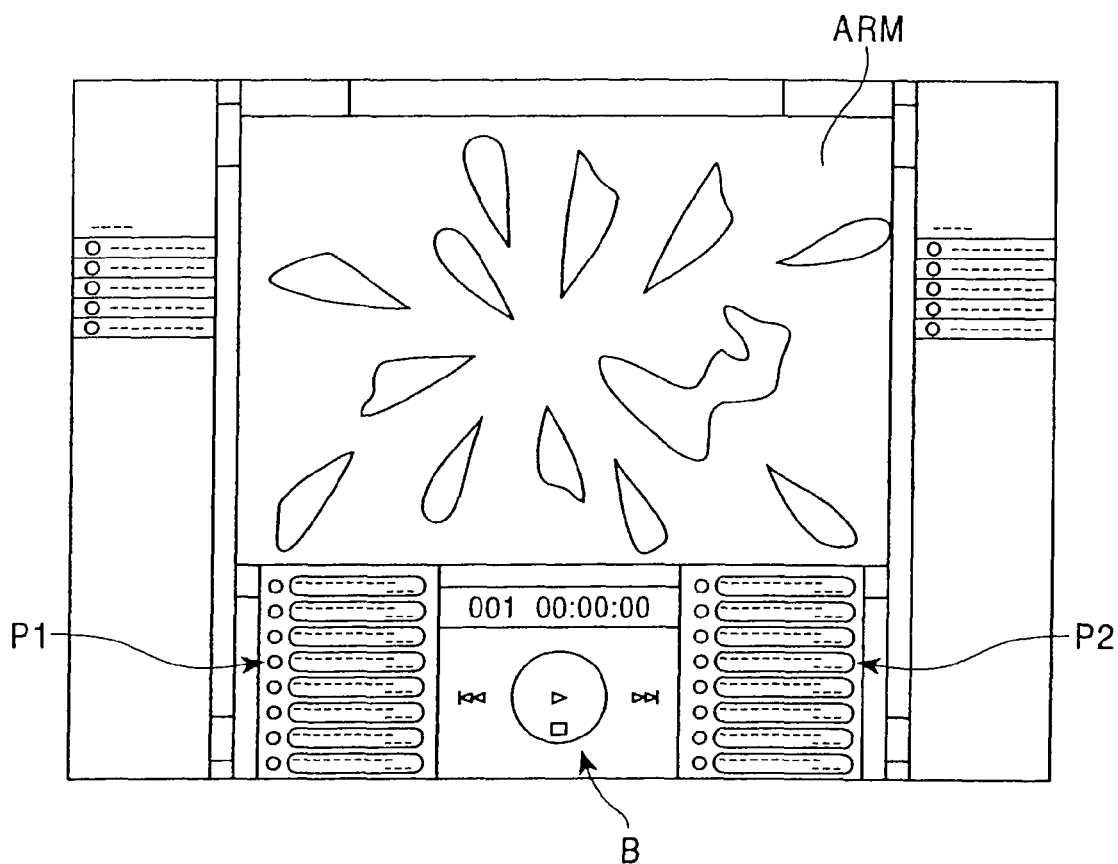
FIG. 14 is a plan view showing a display screen when a soft playback style is selected.

In comparison, FIG. 14 shows a menu screen when a playback style based on a soft atmosphere is selected. In this case, the menu screen is formed by a soft design based on horizontal and vertical lines. In this case, the stock trays ST1 and ST2 are omitted and the play lists P1 and P2 are directly disposed in the vicinity of the operation element B, and the display of the music names, etc., in the play lists P1 and P2 is cyclically displayed according to the switching of the contents. Also for the moving picture, a cloud-like object with a soft color and shape is formed in such a manner as to be scattered radially from the center. As a result, in this case, a gentle impression is given to the user.

In comparison, a switching-time sound effect (FIG. 12) is a sound effect which is played back immediately after switching when, during playback, the playback style is switched to a playback style based on a hard atmosphere, a playback style based on a standard atmosphere, and a playback style based on a soft atmosphere, and a sound effect corresponding to each playback style is entered, respectively. In contrast, sound effect 1 to sound effect 10 are sound effects which are interposed between the contents during playback based on the same style, and 10 types of sound effects are entered for each style. The sound effects 1 to 10 are sound effects of 5 seconds, 10 seconds, and 20 seconds for a playback style based on a hard atmosphere, for a playback style based on a standard atmosphere, and for a playback style based on a soft atmosphere, respectively. The switching-time sound effect is sound effect which is longer than the corresponding sound effects 1 to 10.

For a playback style based on a hard atmosphere, the sound effects 1 to 10 and the switching-time sound effect are formed in such a way that predetermined plosives are placed before and after a voice by a male, and short phrases such as "Take it easy" or "That's good" are assigned to the voice of this male. In comparison, for the switching-time sound effect, a phrase of a certain length is assigned so that a style change can be easily recognized. As a result, for a playback style based on a hard atmosphere, it is possible to create an atmosphere as if a male disk jockey (DJ) is quickly introducing a rock song by a digest.

In comparison, for a playback style based on a standard atmosphere, the sound effects 1 to 10 and the switching-time sound effect are formed in such a way that an oscillating tone while tuning a radio is disposed before and after the voice of the male. For the sound effects 1 to 10, a relatively long phrase is assigned to the voice of this male, and for the switching-time sound effect, a phrase of a certain length is assigned so that a style change can be easily recognized. As a result, for a playback style based on a standard atmosphere, it is possible to create an atmosphere as if a radio DJ is introducing a pop song by a digest.

In comparison, for a playback style based on a soft atmosphere, the sound effects 1 to 10 and the switching-time sound effect are formed by a voice of a female. For the sound effects 1 to 10, a relatively long phrase is assigned to the voice of this female, whereas for the switching-time sound effect, similar to the hard case, a phrase of a certain length is assigned so that a style change can be easily recognized. As a result, for this playback style based on a soft atmosphere, it is possible to create an atmosphere as if a female DJ is introducing a piece of easy listening music by a digest in an FM broadcast.

In that manner, when the play-style change buttons BPS1 to BPS3 are operated by the user, the central processing unit 12 sets the operating conditions of the signal processing system in accordance with a corresponding template, thereby cutting out audio data in sequence according to the atmosphere selected by the user and playing it back, and switches the display of the screen. In contrast, when these operations are performed during playback, the operating conditions of the signal processing system and the display screen are switched in a similar manner, and the switching-time sound effect is interposed so as to switch the playback object.

Figure 15:
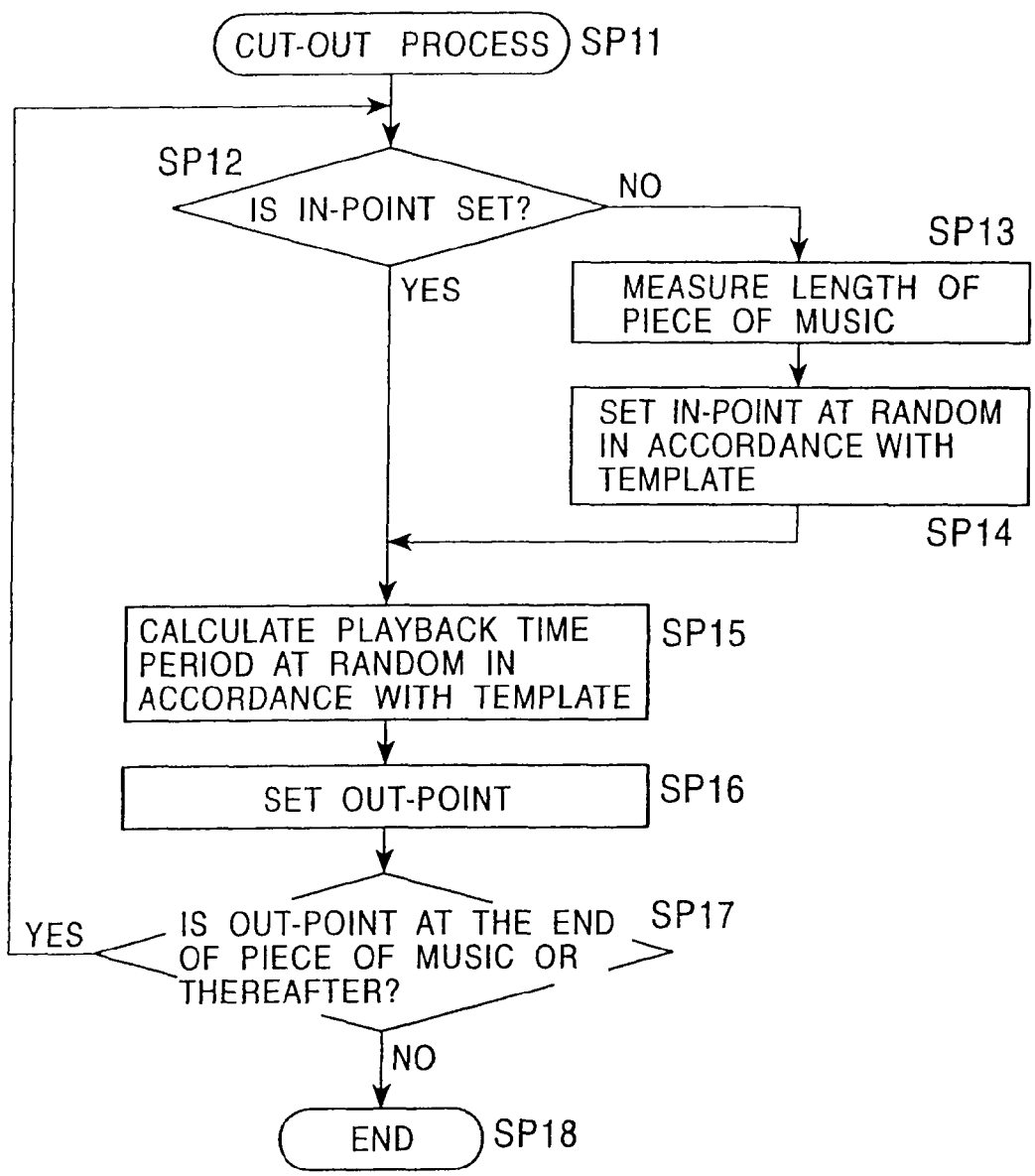
FIG. 15 is a flowchart showing a cut-out process by the personal computer of FIG. 1.

FIG. 15 is a flowchart showing a cut-out process in which a template which is set in this manner is used. In this cut-out process, the central processing unit 12 proceeds from step SP11 to step SP12, whereby it is determined whether or not an in-point is set in the content of an object to be processed by a series of processes from the operation of the button BE for an editing operation (to be described later). When a "NO" result is obtained in this step, the central processing unit 12 proceeds to step SP13, whereby the length of the piece of music, which is the content, is measured. Here, this measurement is performed by reading, for example, the time information which is set in the audio data.

The central processing unit 12 then proceeds to step SP14, whereby an in-point is randomly set on the basis of the time information which is read in this manner and the playback reference time of the template. In this case, the central processing unit 12 creates the time information of the in-point by multiplying a random number in a range of, for example, 0 to 1, by the playback time obtained by subtracting the playback reference time from the playback time of the entire piece of music, and sets an in-point so that this content can be played back for at least the playback reference time.

When the in-point has been set in this manner, or when a "NO" result is obtained in step SP12, the central processing unit 12 proceeds to step SP15, whereby the central processing unit 12 randomly calculates the playback time in accordance with the template. In this step, this playback time is calculated in such a way that, for example, a random number in a range of −1 to 1 is multiplied by the change time of the corresponding playback style and the multiplication result is added to the playback reference time.

In the following step SP16, the central processing unit 12 adds the time information calculated in step SP15 to the time information of the in-point which is set in step SP14, thereby calculating the time information of an out-point in order to set the out-point. In the following step SP17, the central processing unit 12 determines whether or not this out-point has been set beyond the end of the piece of music. When a "YES" result is obtained in this step, the process returns to step SP12, whereby the editing point is set once more. When, in contrast, a "NO" result is obtained, the process proceeds to step SP18, and this processing procedure is terminated.

As a result, the central processing unit 12 cuts out a different portion and sets it as a playback object for each playback time. In the personal computer 1, as a result, even when playback is performed repeatedly in accordance with the same template, a different impression is given to the user for each playback time, thereby preventing the user from becoming bored.

Figure 16:
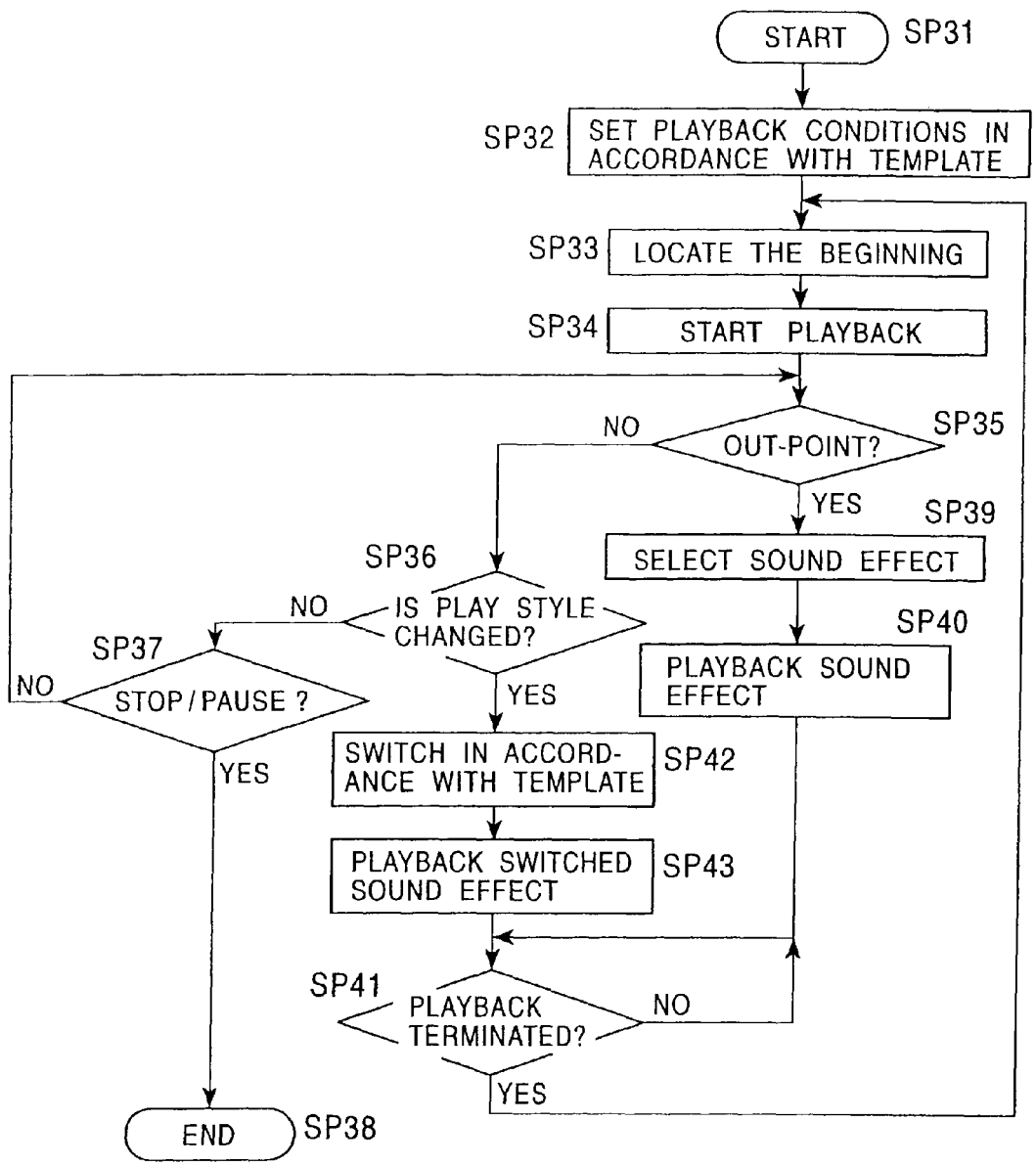
FIG. 16 is a flowchart illustrating the playback of an object to be processed which is cut out according to the process of FIG. 15.

FIG. 16 is a flowchart showing the processing procedure of the central processing unit 12 with regard to a relationship with a playback object which is cut out in this manner. When a playback is instructed, the central processing unit 12 proceeds from step SP31 to step SP32, whereby playback conditions are set in accordance with a template. Here, the settings of these playback conditions are the settings of the frequency characteristics of an equalizer, filters for creating a sound field, etc. In the following step SP33, the central processing unit 12 loads the corresponding audio data so that the playback can be started from the in-point set in accordance with the processing procedure of FIG. 15, thereby locating the beginning of this piece of music.

Then, the central processing unit 12 proceeds to step SP34, whereby the playback of this content is started, after which, in step SP35, it is determined whether or not an out-point has been reached. When a "NO" result is obtained in this step, the central processing unit 12 proceeds to step SP36, whereby it is determined whether or not a changing of a play list is instructed from the user. When a "NO" result is obtained in this step, the central processing unit 12 proceeds to step SP37, whereby it is determined whether or not the stop button BST or the playback/pause button BP has been operated. When a "YES" result is obtained, the central processing unit 12 proceeds to step SP38, whereby this processing procedure is terminated. When, in contrast, a "NO" result is obtained, the central processing unit 12 returns to step SP35.

As a result, from when the playback of the playback object is started until the playback of this playback object is completed, the central processing unit 12 repeats the processing procedure of steps SP35, SP36, and SP37. When the content of this playback object is played back up to the out-point, a "YES" result is obtained in step SP35, and thus, the central processing unit 12 proceeds to step SP39. In this step, the central processing unit 12 selects one sound effect from the sound effects 1 to 10 of the corresponding template based on a random selection, and in the following step SP40, the central processing unit 12 starts playing back this sound effect. At this time, the central processing unit 12 starts playing back the sound effect in such a manner as to be connected by a cross-fade in accordance with a transition time set in the template, and in contrast with this, terminates the playback of the content.

When the playback of the sound effect is started in this manner, the central processing unit 12 proceeds to step SP41, whereby it is determined whether or not the playback of the sound effect has been terminated. When a "NO" result is obtained, step SP41 is repeated. When, in contrast, a "YES" result is obtained, the process proceeds to step SP33, whereby the beginning of the new content is located. As a result of repeating these processes, the central processing unit 12, as shown in FIG. 17, randomly cuts out a playback object from each content in a range of 19 to 21 seconds (part (1) of FIG. 17A), and plays back this cut-out playback object by connecting it with a sound effect of a short time T (part (2) of FIG. 17A) when a playback based on a hard atmosphere is selected. At this time, this sound effect is randomly selected from 10 types of sound effects 1 to 10 (H1 to H10) and is interposed in between.

As a result, in this case, the central processing unit 12 plays back the contents according to two play lists in sequence alternately with a colorful atmosphere so that the user does not become bored.

In contrast, when a playback based on a standard atmosphere is selected, a playback object is randomly cut out from each content in a range of 35 to 45 seconds (part (1) of FIG. 17B), and this cut-out playback object is played back in such a way that it is connected with a sound effect by a cross-fade for a transition time t of 2 seconds (part (2) of FIG. 17B). Furthermore, at this time, this sound effect is randomly selected from 10 types of sound effects 1 to 10 (ST1 to ST10). As a result, in this case, the central processing unit 12 plays back the contents according to two play lists in sequence alternately by a slightly subdued atmosphere so that the user does not become bored.

When playback based on a soft atmosphere is selected, the playback object is randomly cut out from each content in a range of 50 to 70 seconds (part (1) of FIG. 17C), and this cut-out playback object is connected to a sound effect by a cross-fade for a transition time t of 5 seconds and is played back (part (2) of FIG. 17C). Furthermore, at this time, this sound effect is randomly selected from 10 types of sound effects 1 to 10 (SF1 to SF10). As a result, also in this case, the central processing unit 12 plays back contents according to two play lists in sequence alternately with a subdued atmosphere so that the user does not become bored.

When a change of a play style is instructed from the user during playback, the central processing unit 12 proceeds from step SP36 to step SP42 (FIG. 16). In this step, the central processing unit 12 loads various parameters and information from the template corresponding to the play style selected by the user and switches the corresponding settings. That is, the central processing unit 12 switches the atmosphere of the playback result so as to correspond to the play style as a result of the change of the settings of the equalizer, the sound volume, and the sound field. Furthermore, the settings of the GUI information and the moving picture are switched to cause the atmosphere of the display screen to correspond to the play style.

Then, the central processing unit 12 proceeds to step SP43, whereby the playback of the corresponding sound effect at the switching time is started, and the process proceeds to step SP41. As a result, when a change of a play style is instructed from the user during playback, the central processing unit 12 instantly switches the atmosphere of the playback, and plays back a sound effect for a long time so that this switching can be recognized. Furthermore, thereafter, the contents according to two play lists are played back in sequence alternately according to, the changed play style.

FIG. 18 is a plan view showing the play-list status display area ARS together with the peripheral components. When a button BE for an editing operation is operated, the central processing unit 12 displays this menu for editing in the play-list status display area ARS. When one of the pieces of music is selected by the user in the play lists P1 and P2 and the stock trays ST1 and ST2 in a state in which this menu for editing is being displayed, the personal computer 1 sets this piece of music as an editing object and receives a setting of the in-point in this piece of music.

Here, in this menu for editing, a rectangular display H2 showing the current playback position is displayed in such a manner as to overlap a bar-shaped display H1 indicating the total length of the piece of music. When the in-point has been set, a flag icon M1 indicating the set place of the in-point is displayed. This flag icon M1 is in the same shape as the icon displayed in the music name in which the editing point is set in the play lists P1 and P2. This makes it possible for the personal computer 1 to facilitate user's understanding.

Furthermore, below this bar-shaped display H1, a display of the time information indicating the playback place, a button BE1 for setting an in-point, and a display of the time information indicating the place where the in-point is set are disposed. In addition, below these, a stop button BE2, a playback button BE3, a button BE4 for a playback from the in-point, and a button BE5 for releasing the setting of the in-point are disposed. Furthermore, below these, an OK button BE6 and a cancel button BE7 are disposed.

When a piece of music is selected by the user and the playback button BE3 is operated, the central processing unit 12 starts playing back from the start of this piece of music and causes the rectangular display H2 to be moved in sequence. When this rectangular display H2 is being dragged by a mouse, the current playback place is changed according to this movement. Furthermore, when the stop button BE2 is operated, the playback is stopped, whereas, when the in-point setting button BE1 is operated, the current playback position is set as the in-point.

In comparison, when the button BE4 for a playback from the in-point is operated, the playback is started from the in-point which is set in this manner. When a flag icon M1 is dragged by a mouse, the position of the in-point is changed according to this movement. When the button BE5 for releasing the setting of the in-point is operated, the setting of the in-point is released. In the personal computer 1, this makes it possible for the user to set the in-point and to confirm the setting of the in-point. When the in-point is set in this manner and the OK button BE6 is operated by the user, the central processing unit 12 enters the setting of the in-point in the corresponding play list. In comparison, when the cancel button BE7 is operated, the entry of the in-point set in this manner becomes invalid.

As a result, in the personal computer 1, it is possible to individually set playback from a place intended by the user instead of using an automatically cut-out playback.

(2) Operation of the Embodiments

In the above construction, in the personal computer 1 (FIGS. 1 and 2), for example, as a result of connecting an interface or as a result of playback of a compact disk, various audio data is downloaded onto the hard disk drive 50. Furthermore, as a result of such settings at the download time and as a result of selecting audio data downloaded by a predetermined application program, a play list is created in which, for example, the contents are formed into a list for each genre and artist desired by the user.

In the personal computer 1, when MusicShaker, which is one of the application programs, is activated, a menu screen by a design, in which a moving-picture display area ARM, the stock trays ST1 and ST2, the button B, etc., are disposed in the center, and the other portions are covered with a cover, is displayed (FIG. 3). When the predetermined button B1 or B2 on this menu screen is operated, the display of the cover is removed, and the display of the play lists P1 and P2 appears (FIG. 4).

When an autoloading button BAU is operated in this state (FIG. 6), the contents recorded on the hard disk drive 50 are randomly grouped in this application program and a play list is created (FIG. 7), and the music names in accordance with this template are displayed in sequence in the play list P1 or P2 and the stock tray ST1 or ST2 (FIGS. 6 and 8). Furthermore, when a play list, which has been entered in advance, is selected, as a result of operating a combo box BX, etc., the music names in accordance with this template are displayed in sequence in the play list P1 or P2 and the stock tray ST1 or ST2. Furthermore, as a result of the operation of the shake button BSH and various operations such as dragging-and-dropping with a mouse in a state in which the music names are displayed in this manner and furthermore as a result of a process performed by operating a button BEL which opens the editing menu, the play list is updated or created, or the display of the music names in the play list P1 or P2 and the stock tray ST1 or ST2 is changed or updated.

In such a display, the personal computer 1 arranges and displays the displays showing the contents of the play list so that the contents become continuous in sequence in a playback sequence from the content which is currently being played back with respect to the piece-of-music information display area ARP, which is a display showing the content which is currently being played back, and with respect to a button BP, which is at least a display of an operation element for instructing starting of playback or a display of an operation element for instructing stopping of playback.

Figure 10:
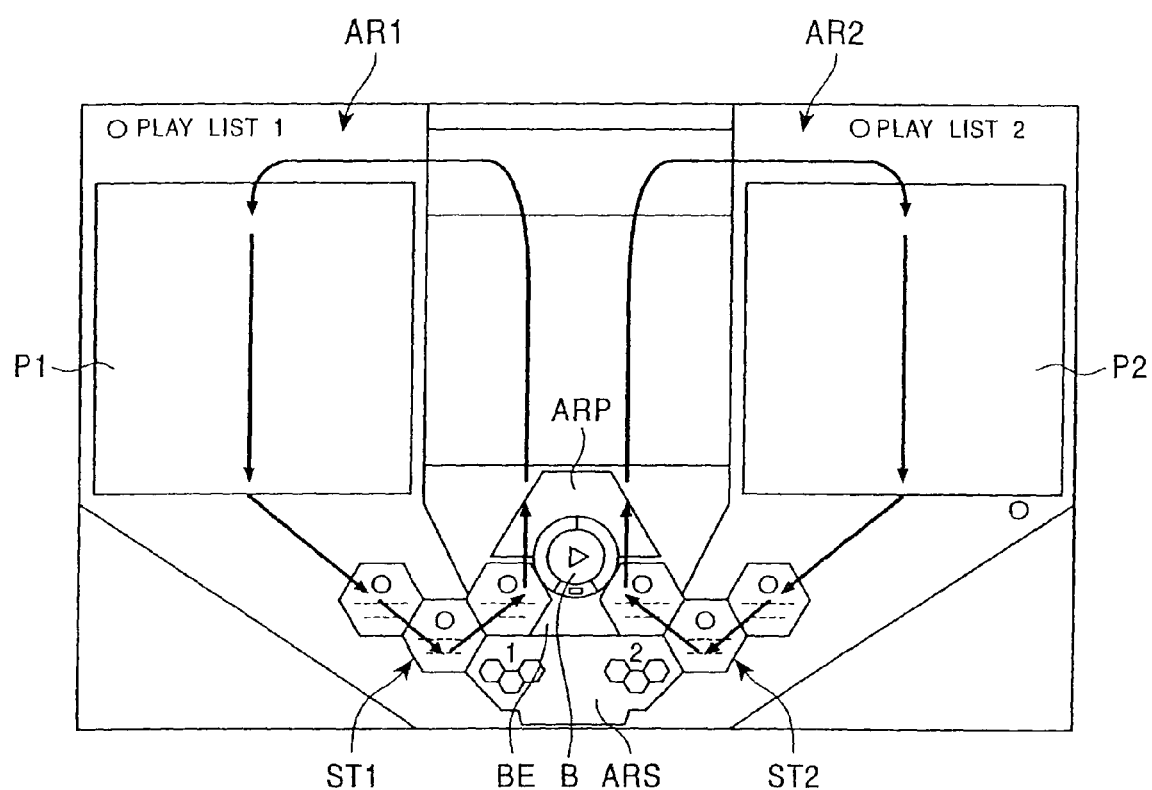
FIG. 10 is a plan view illustrating the switching of play-list displays.

In addition, when playback is instructed as a result of the operation of the playback button BP in a state in which the music names are displayed in the two play lists P1 and P2 and the corresponding stock trays ST1 and ST2 in this manner, the contents are switched in this display order and are played back, and furthermore, in response to this switching of the contents, the display showing the contents in the play lists P1 and P2 and the corresponding stock trays ST1 and ST2 is switched (FIG. 9). Also, the play lists for the objects of playback are alternately switched, and the content whose playback have been terminated are changed to an unnoticeable color and displayed at the end of the play list. As a result, the display of the music names is switched in response to the switching of the piece of music in such a way that the music names cycle on the play lists P1 and P2 side around the piece-of-music information display area ARP and the button BST, which gives the user an impression of a playback process (FIG. 10).

As a result, it is possible for the user to recognize the relationship with the playback process even more easily than a conventional way, such as which piece of music is currently being played back, which piece of music is to be played back next, and in what place the user's preferred piece of music is to be played back. Thus, the ease of use can be correspondingly improved even more.

Furthermore, by placing the piece of music whose playback has been terminated at the end, playback can be performed repeatedly, and since the display of the piece of music whose playback has been terminated is switched at this time, it is possible to recognize the start of the play list without mistake.

Furthermore, as a result of alternately playing back two types of play lists in this manner, it is possible to play back limited play lists in various combinations. As a result, a case occurs in which pieces of music which are not desired by the user are continuously played back continuously. This makes it possible to perform a playback in a combination of various pieces of music by a playback method that will pleasantly surprise the user and with a high degree of freedom.

Since at least the content which is currently being played back and the content to be played back next are displayed in such a manner that the contents can be mutually distinguished from the other content on the basis of such arrangement of the two play lists and the two stock trays, and playback is switched by mixing with a cross-fade in which sound effect is interposed in between, it is possible to clearly display which piece of music is being processed, and the ease of viewing for the user can be correspondingly improved to improve the ease of operation. Furthermore, by making it possible to perform an operation of setting the in-point, etc., in each play list, an editing operation having a high degree of freedom can be performed.

Since the contents of the two play lists are alternately played back in this manner, in the personal computer 1, when the play-style change buttons BPS1 to BPS3 are operated (FIG. 5), the operating conditions of the signal processing system are switched in accordance with the record (FIG. 11) of the template corresponding to the operation button. As a result, when a playback style based on a hard atmosphere is selected, each content is played back in an atmosphere in which a high tone and a low tone are accentuated by a relatively high sound volume and as if test-listening in a small room. When a playback style based on a soft atmosphere is selected, each content is played back in an atmosphere in which a high tone and a low tone are suppressed by a relatively low sound volume and as if test-listening in a large hall. Furthermore, in the standard case, each content is played back in an atmosphere which is between the hard and soft cases. As a result, it becomes possible to simply and reliably perform the setting of each parameter of the signal processing system by one operation.

Furthermore, in response to these switchings, the design of the display screen is switched in accordance with the GUI information which is set in each template and the moving-picture information (FIGS. 13 and 14). As a result, in the personal computer 1, it is also possible to easily change the setting of the display screen. For the user, not only can the playback results be test-listened, but also the play style selected by the user can be confirmed via the display screen, thus improving the ease of use. Furthermore, for a user unfamiliar with the operations of a personal computer, it is possible to easily change the design and to various switch the playback atmosphere. This makes it possible to easily and reliably create an atmosphere matching the user's vision.

Since each content is played back in this manner, in the personal computer 1, an in-point and an out-point are set in each content in accordance with a cut-out pattern recorded in the template of this play style, and a playback object is cut out (FIGS. 15 and 16). As a result, in the personal computer 1, portions to be partially played back are set in each content of a group of contents according to the play list, and the cut-out playback objects, which are portions to be played back, are continuously played back continuously in sequence. As a result, it is possible for the personal computer 1 to play back contents with a method different from a conventional method.

At this time, in the personal computer 1, an in-point and an out-point are randomly set so that different portions are cut out each time of a cut-out in accordance with a time setting according to the play style, and playback is performed in such a way that a sound effect is interposed between playback objects. As a result, the setting of this sound effect allows these groups of contents to be played back like a digest in a radio, etc. So, the user does not become bored.

A sound effect to be interposed between contents is determined based on a random selection from a plurality of types of sound effects 1 to 10, and the cut-out time is irregularly varied in accordance with the template. So, the user does not become bored.

Furthermore, since the setting of the cut-out time differs according to the play style, a cut-out pattern is selectable according to the play style. Also, the sound effect is switched according to this selection of the cut-out pattern, thereby allowing continuous contents to be cut out and played back according to the playback style corresponding to the atmosphere selected by the user.

In the personal computer 1, such a connection between the playback object and the sound effect is made and played back by mixing with a cross-fade. As a result, a sense of incongruity, when each content is played back by such a digest format, is prevented. Furthermore, this cross-fade causes the transition time to be switched according to each playback style, and the sound effect and the contents can be connected by a connection appropriate for the playback style selected by the user and can be played back.

As a result of the above, if playback is performed in this manner, it is not required to test-listen the same place with the same sound effect by the relationship before and after the same contents even if it is listened repeatedly many times, so that the user does not become bored. Furthermore, it is also possible for the user to test-listen from the middle of a piece of music without using any operations for each piece of music, and playback can be continuously performed without cutting off the sound as a result of the interposition of the sound effect, so that stage effects in a television, radio program, etc., can also be expected.

For performing playback in this manner, a case is conceived in which the user does not desire a playback with such an irregular cutout. In this case, by opening the edit menu by operating the button BE for an editing operation (FIG. 18), an in-point is set in a desired place, and each content can be played back from this in-point in accordance with a variously changing playback time. As a result, also for such user, the user's desires can be taken into account so that the user does not become bored.

Furthermore, in a case where the playback style is switched while playback is being performed according to a predetermined playback style, the signal processing system and the display are switched so as to correspond to this switching, and a switching-time sound effect, which is special for such a switching time, of a longer playback time, in comparison with the other sound effects, is interposed between the contents. As a result, it is possible for the user to confirm the switching of the playback style by just listening to it.

According to the above construction, each content is cut out and is continuously played back based on a predetermined cut-out pattern in which at least a playback time is set. As a result, it is possible to play back the contents by a method different from a conventional method, and the ease of use can be improved correspondingly.

Furthermore, by performing a playback in such a way that a predetermined sound effect is interposed between portions to be partially played back which are cut out in this manner, this setting of the sound effect causes these contents to be played back as if being a digest in a radio, etc., thereby making it possible to prevent the user from becoming bored.

Furthermore, at this time, by randomly selecting the sound effect, it is possible to prevent the user from becoming bored.

Also, by irregularly varying the cut-out time, it is possible to prevent the user from becoming bored.

Furthermore, by making this cut-out pattern selectable, it is possible to cut out contents according to the preference of the user.

Furthermore, by switching the sound effect according to the selection of this cut-out pattern, by switching the connection with the sound effect, or by switching the sound effect during playback, such as a sound field, it is possible to play back contents according to the preference of the user.

Furthermore, by switching the conditions of the operation of the processing system which processes contents, and by switching the design of the display screen in response to the switching, it is possible to simplify the setting, etc., of the display screen.

Furthermore, at this time, by selecting a corresponding list from among a plurality of lists in response to an operation of this operation element, and by switching the conditions of the operation of the processing system according to the selected list, a mere selection of a desired list allows various types of settings to be changed, and various types of settings can be simplified correspondingly.

Furthermore, by producing a display by arranging the displays showing the contents of the play lists so that the contents become continuous in sequence in a playback sequence from the content which is currently being played back from the display of an operation element which causes an image of a playback process to appear or from the display showing the content which is currently being played back, it is possible to recognize the relationship with the playback process even more easily than a conventional way.

Furthermore, at this time, by placing the display showing the content whose playback has been terminated at the end of the play list display, even when a playback is performed repeatedly, it is possible to recognize the relationship with the playback process even more easily than a conventional way.

Since the display showing a piece of content is the name of the content, the present invention can be applied to the playback of audio data, and the content can be easily recognized.

Furthermore, in a case where the playback of one piece of content of one play list from among a plurality of play lists is terminated, one piece of content of another play list is played back, and at least the content which is currently being played back and the content to be played back next are displayed so that the contents can be mutually distinguished from the other content. Thus, even when a plurality of play lists is selected in units of contents and is played back, the relationship with the playback process can be recognized even more easily than a conventional way.

In addition, by forming such a display capable of being distinguished from the other content by arranging the displays showing the contents from a display of an operation element which causes an image of a playback process to appear or from a display showing the content which is currently being played back for each play list, the relationship with the playback process can be recognized even more easily than a conventional way.

Other Embodiments

In the above-described embodiment, a case is described in which contents are cut out by changing a cut-out method according to a playback style, and a sound effect is interposed in between, and a playback is performed according to an atmosphere corresponding to the play style. However, the present invention is not limited to this case, and each content may be simply cut out for a playback.

Although in the above-described embodiment, a case is described in which, for the content desired by the user, an in-point can be set, the present invention is not limited to this case, and can be widely applied to a case in which these settings are not received and to a case in which an out-point can be set as well with regard to the content desired by the user.

Although in the above-described embodiment, a case is described in which, for the switching of the operation of the processing system according to a play style, cut-out conditions, sound volume, sound quality, sound effect, conditions of connection, etc., are switched, the present invention is not limited to this case, and can be widely applied to a case in which only the frequency characteristics are simply switched.

Although in the above-described embodiment, a case is described in which the design of the display screen is switched by switching the arrangements of buttons, etc., and the background, the present invention is not limited to this case, and the design of the display screen may be switched by switching, for example, only the background.

Although in the above-described embodiment, a case is described in which contents are cut out by changing the cut-out method according to a play style and a sound effect is interposed in between, and playback is performed according to an atmosphere corresponding to the playback style, the present invention is not limited to this case, and can be widely applied to a case in which all the pieces of music of each content are played back.

Although in the above-described embodiment, a case is described in which, for the content whose playback has been terminated, the display is switched and the content is displayed at the end of the play list on the assumption that playback is repeated, the present invention is not limited to this case, and, for example, this process may be omitted for only one playback. Furthermore, even when the content is placed at the end, the switching of the display may be stopped as necessary.

Although in the above-described embodiment, a case is described in which two play lists are alternately played back, the present invention is not limited to this case, and can be widely applied to a case in which one play list is played back.

Although in the above-described embodiment, a case is described in which a play list is edited as necessary, and furthermore, a case is described in which playback is performed on the basis of the edited play list, the present invention is not limited to this case, and can be widely applied to a case in which a list of music names recorded in the TOC (Table of Contents) of one recording medium, such as, for example, a compact disk, is used as a play list, and to a case in which a record of various types of management tables, etc., for managing the contents inside a personal computer, is used as a play list.

Although in the above-described embodiment, a case is described in which a play list is displayed, and the display is switched, the present invention is not limited to this case, and can be widely applied to a case in which a play list is only simply displayed, and also to a case in which a play list is not displayed.

Although in the above-described embodiment, a case is described in which contents composed of audio data are played back, the present invention is not limited to this case, and can be widely applied to a case in which contents are composed of, for example, video data. In this case, a case is conceived in which the interposition of a sound effect is stopped, and the cut-out video image is connected by a cross-fade, a wipe, etc. Furthermore, instead of or in addition to the display showing the contents, such as music names in a play list, a still picture extracted from each content may be used.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

The invention claimed is:

1. A reproduction apparatus reproducing pieces of content sequentially in accordance with a playlist on which the pieces of content to be reproduced are recorded, the reproduction apparatus comprising:
   a display section to display multiple playlists; and
   a reproduction section to reproduce, when reproduction of one piece of content of one of the multiple playlists is terminated, one piece of content of another playlist,
   the display section displaying at least a piece of content currently being reproduced and a piece of content to be subsequently reproduced, respectively distinguishably from other pieces of content.

2. The reproduction apparatus according to claim 1, wherein:
at least the piece of content currently being reproduced and the piece of content to be subsequently reproduced are displayed, respectively distinguishably from the other pieces of content, by the display section displaying displays indicating pieces of content of the playlists in such a manner that the displays are successively arranged, in an arrangement, for each playlist in a reproduction order from the piece of content currently being reproduced, at least starting from a display of an operating element instructing to start reproduction or a display of an operating element instructing to stop reproduction.

3. The reproduction apparatus according to claim 2, wherein a display indicating reproduced content is placed at an end of the corresponding arrangement.

4. The reproduction apparatus according to claim 1, wherein:
at least the piece of content currently being reproduced and the piece of content to be subsequently reproduced are displayed, respectively distinguishably from the other pieces of content, by the display section forming a display indicating the piece of content currently being reproduced in a predetermined region of the display section, and displaying, with respect to the display indicating the piece of content currently being reproduced, displays indicating pieces of content of the playlists in such a manner that the displays indicating pieces of content of the playlists are successively arranged, in an arrangement, for each playlist in a reproduction order.

5. The reproduction apparatus according to claim 4, wherein a display indicating reproduced content is placed at an end of the corresponding arrangement.

6. The reproduction apparatus according to claim 1, wherein the content is audio data, and reproduction results of the successive pieces of content are subjected to mixing and output.

7. A reproduction method of reproducing pieces of content sequentially in accordance with a playlist on which pieces of content to be reproduced are recorded, the reproduction method comprising:
displaying multiple playlists;
reproducing, when reproduction of one piece of content of one of the multiple playlists is terminated, one piece of content of another playlist; and
displaying at least a piece of content currently being reproduced and a piece of content to be subsequently reproduced, respectively distinguishably from the other pieces of content.

8. The reproduction method according to claim 7, wherein:
at least the piece of content currently being reproduced and the piece of content to be subsequently reproduced are displayed, respectively distinguishably from the other pieces of content, by displaying displays indicating pieces of content of the playlists in such a manner that the displays are successively arranged, in an arrangement, for each playlist in a reproduction order from the content currently being reproduced, at least starting from a display of an operating element instructing to start reproduction or a display of an operating element instructing to stop reproduction.

9. The reproduction method according to claim 8, wherein a display indicating reproduced content is placed at an end of the corresponding arrangement.

10. The reproduction method according to claim 7, wherein:
at least the piece of content currently being reproduced and the piece of content to be subsequently reproduced are displayed, respectively distinguishably from the other pieces of content, by forming a display indicating the piece of content currently being reproduced in a predetermined region of a display section, and displaying, with respect to the display indicating the piece of content currently being reproduced, displays indicating pieces of content of the playlists in such a manner that the displays indicating pieces of content of the playlists are successively arranged, in an arrangement, for each playlist in a reproduction order.

* * * * *